US008542774B2

(12) United States Patent
Atungsiri

(10) Patent No.: US 8,542,774 B2
(45) Date of Patent: Sep. 24, 2013

(54) RECEIVER AND METHOD

(75) Inventor: Samuel Asangbeng Atungsiri, Basingstoke (GB)

(73) Assignee: Sony Corporation, Tokyo (JP)

( * ) Notice: Subject to any disclaimer, the term of this patent is extended or adjusted under 35 U.S.C. 154(b) by 228 days.

(21) Appl. No.: 12/829,907

(22) Filed: Jul. 2, 2010

(65) Prior Publication Data

US 2011/0013732 A1 Jan. 20, 2011

(30) Foreign Application Priority Data

Jul. 15, 2009 (GB) .................................. 0912310.0

(51) Int. Cl.
*H04L 27/00* (2006.01)

(52) U.S. Cl.
USPC .............................. 375/316; 375/260; 375/272

(58) Field of Classification Search
USPC ........................... 375/260, 346–350, 362–365
See application file for complete search history.

(56) References Cited

U.S. PATENT DOCUMENTS

| | | | | |
|---|---|---|---|---|
| 6,130,922 | A * | 10/2000 | Stott et al. ...................... | 375/344 |
| 7,447,277 | B2 * | 11/2008 | Yajima et al. .................. | 375/326 |
| 2006/0062316 | A1 | 3/2006 | Kim | |
| 2006/0120468 | A1 | 6/2006 | Lin et al. | |
| 2006/0140110 | A1 | 6/2006 | Lin | |
| 2009/0135977 | A1 * | 5/2009 | Sheu ............................. | 375/362 |

FOREIGN PATENT DOCUMENTS

| | | |
|---|---|---|
| EP | 1 267 536 A1 | 12/2002 |
| GB | 2 412 552 | 9/2005 |
| WO | WO 01/24410 A1 | 4/2001 |

OTHER PUBLICATIONS

U.S. Appl. No. 12/782,991, filed May 19, 2010, Atungsiri.
Extended Eurpean Search Report issued Feb. 6, 2012, in European Patent Application No. 10167118.8.
U. Reimers, "DVB" 11 The Standard for Terrestrial Transmission and Its Decoding Technique, XP-002667785, Mar. 1, 2005, pp. 244-257.

* cited by examiner

*Primary Examiner* — Sam K Ahn
*Assistant Examiner* — Janice Tieu
(74) *Attorney, Agent, or Firm* — Oblon, Spivak, McClelland, Maier & Neustadt, L.L.P.

(57) ABSTRACT

A receiver for detecting and recovering data from Orthogonal Frequency Division Multiplexed (OFDM) symbols. The receiver comprises a demodulator, symbol synchronization unit, frequency transform processor, and coarse frequency offset detector. The demodulator generates sampled symbols. The symbol synchronization unit has correlators, which receives the sampled symbols, and a correlation detection processor. Each correlator auto correlates each sampled symbol, and the correlation detection processor determines a start point of each symbol. The frequency transform processor receives the sampled symbols and performs a frequency transform on each symbol. The coarse frequency offset detector includes a pilot data filter, which includes taps corresponding to a value and spacing of the pilot pattern of the symbols and arranged to receive as an input the frequency domain symbols from the frequency transform processor, and a coarse frequency offset detect processor, which is arranged to detect a coarse frequency offset output from the pilot data filter.

14 Claims, 16 Drawing Sheets

US 8,542,774 B2

RECEIVER AND METHOD

FIELD OF THE INVENTION

The present invention relates to receivers and methods for detecting and recovering data from Orthogonal Frequency Division Multiplexed (OFDM) symbols that have been transmitted via a channel.

BACKGROUND OF THE INVENTION

There are many examples of communications systems in which data is communicated using Orthogonal Frequency Division Multiplexing (OFDM). Systems which have been arranged to operate in accordance with Digital Video Broadcasting (DVB) standards for example, utilise OFDM. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols.

In order to allow data to be recovered from the OFDM symbols in the presence of multi-path which causes the same OFDM symbols to be received via echo paths and/or simulcast in which the same OFDM symbols are received from more than one transmitter, it is conventional to include a time domain guard interval between successive OFDM symbols. The guard interval is formed by repeating samples in the time domain from a 'useful' part of the OFDM symbols. The useful part of the OFDM symbols correspond to the samples in the time domain which are formed when the modulated sub-carriers are transformed into the time domain from the frequency domain. As a result of the guard interval, all of the samples from the useful part of the OFDM symbols can be received by a receiver provided that the multi-path or the simulcast delay between versions of the same OFDM symbols does not exceed the guard interval.

However, detecting and recovering data from the useful part of the OFDM symbols at the receiver can nevertheless present a technical problem.

SUMMARY OF THE INVENTION

According to the present invention there is provided a receiver for detecting and recovering data from Orthogonal Frequency Division Multiplexed (OFDM) symbols, the OFDM symbols including pilot data arranged in accordance with a pilot pattern and a guard interval. The guard interval is formed by copying samples from a useful part of the OFDM symbol in the time domain and a length of the guard interval for each OFDM symbol corresponds to one of a plurality of predetermined lengths. The receiver comprises a demodulator operable to detect a signal representing the OFDM symbols and to generate a sampled version of the OFDM symbols in the time domain. The receiver also includes a symbol synchronisation unit, comprising a plurality of correlators into which each sampled OFDM symbol is concurrently input, and a correlation detection processor. Each correlator is operable to auto correlate each sampled OFDM symbol between a length of samples corresponding to one of the plurality of predetermined lengths, the correlation detection processor being operable to determine a time domain start point of each OFDM symbols based on a point at which one of the correlators from the plurality of correlators detects a correlation. The receiver further comprises a frequency transform processor operable to receive the sampled version of the OFDM symbols and to perform a frequency transform on the OFDM symbol to form a frequency domain version of the OFDM symbols starting at the time domain start point determined by the correlation detect processor. The receiver also includes a coarse frequency offset detector including a pilot data filter and a coarse frequency offset detection processor. The pilot data filter includes taps corresponding to a value and spacing of the pilot pattern of the OFDM symbols and arranged to receive as an input the frequency domain OFDM symbols from the frequency transform processor. The coarse frequency detection processor is arranged to detect any coarse frequency offsets from an output of the pilot data filter. OFDM data received at a receiver is typically formed in the frequency domain and transformed into the time domain for transmission. At a receiver, in order to recover the data transmitted on each OFDM symbol, each OFDM symbol is transformed into the frequency domain typically by performing a fast Fourier transform. In order to do this accurately, a section of the OFDM symbol in the time domain must be identified which will yield an optimum amount of useful energy in the time domain on which to perform a frequency domain transform. This can be achieved by identifying the guard interval section of each OFDM symbol which occur between the OFDM symbols in the time domain. Such an identification can be achieved by correlating the received OFDM symbol with itself. However, OFDM schemes can employ guard intervals of different lengths. Conventionally therefore, before determining the section of the time domain OFDM symbol mentioned above, the guard interval length of the received OFDM symbols must be known in order to set a sample length parameter for the correlation process. Once this is known, the length of the guard interval can then be used to define a length of samples which is used to correlate the received time domain OFDM symbols to identify the position of the guard interval. The position of the OFDM symbol boundaries in the time domain can then be used to provide a symbol synchronisation timing signal which can be used to control the application of the frequency transform to the received OFDM symbols.

Furthermore, once the OFDM symbol has been transformed into the frequency domain, it is desirable to identify any frequency offsets on the recovered sub-carriers which are greater than the width of a sub-carrier (i.e. inter-sub-carrier offsets) in order that data can be extracted correctly from each sub-carrier, which will improve the integrity of the receiver.

A receiver arranged in accordance with the present invention provides an advantage in that a number of correlators, each arranged to detect correlations according to a different guard interval length, are run concurrently. Accordingly, there is no requirement to separately identify the guard interval length prior to determine the symbol boundaries which will speed up and improve an accuracy of the process of identifying the OFDM symbol boundaries. Furthermore, a coarse frequency offset detector is provided which determines a coarse frequency offset of the frequency transformed symbols by identifying a pilot sub-carrier pattern in the received symbols. This provides an advantage because a conventional feature of the received symbols (i.e. the pilot sub-carriers arranged in a pilot pattern) is used to determine the coarse frequency offset. This mitigates the requirement to include any further signalling in the OFDM symbols from which to derive the coarse frequency offset and also efficiently re-uses the pilot data which will be typically decoded in any case in order to provide a channel estimate at the receiver.

In one embodiment in which the sequence of OFDM symbols forms a sequence of frames and each frame is formed from one or a plurality of preamble OFDM symbols followed by a plurality of data payload bearing OFDM symbols, the receiver comprises a frame detector for detecting a beginning point of each frame by detecting the presence of pilot data carriers carrying preamble pilot data in the preamble OFDM symbols of the frame.

In another embodiment in which each preamble OFDM symbol comprises a plurality of header sub-carriers carrying header data, the frame detector is operable to identify a beginning point of each frame by extracting data from the sub-carriers of the received OFDM preamble symbols and identifying extracted data corresponding to the header data of the first OFDM preamble symbols.

Various further aspects and features of the invention are defined in the appended claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

Example embodiments of the present invention are described in the following paragraphs with reference to a receiver operating in accordance with the DVB-C2 standard, although it will be appreciated that embodiments of the present invention find application with other DVB standards and indeed other communications systems which utilise Orthogonal Frequency Division Multiplex (OFDM).

OFDM Data Transmission

OFDM systems transmit data simultaneously on a series of orthogonal frequency sub-carriers. The frequency sub-carriers transmitted over a period of time make up a series of OFDM symbols.

In order to reduce the effects of multi-path propagation and other effects, each OFDM symbol typically includes a guard interval. A guard interval is a portion of each OFDM symbol in the time domain that is copied from one end of the OFDM symbol and inserted at the other. Therefore the total duration of an OFDM symbol will be $T=T_g+T_u$, where $T_g$ is the guard interval duration and $T_u$ is the duration of useful data transmitted. The guard interval can determine the maximum length multi-path delay or simulcast delay which can be tolerated by the system.

A channel via which OFDM symbols are transmitted may vary in time and frequency. Therefore, each OFDM symbol may include pilot sub-carriers which are sub-carriers bearing pilot data of a known phase and amplitude. The pilot data from the pilot sub-carriers can be extracted at the receiver and enable a channel estimate of the channel to be derived. This allows the receiver to compensate for distortion added to the OFDM symbols by channel effects.

For the example of cable transmission, multi-path may be caused by several terminations being present on a cable leading to a partial reflection of the signal at each termination.

The distribution of pilot sub-carriers through a series of consecutive symbols may be arranged in accordance with a repeating pilot pattern. In some OFDM schemes, pilot patterns are defined by a variable, $D_x$ which specifies the spacing between pilot sub-carriers across each symbol, and $D_y$ which specifies how many OFDM symbols are required for each complete cycle of the repeating pattern.

In some OFDM systems, the consecutive series of OFDM symbols that are transmitted are arranged in a number of OFDM frames, each OFDM frame containing a number of OFDM symbols. In such systems, certain OFDM symbols may be designated preamble symbols which indicate the beginning of a frame and contain various signalling data. Such OFDM symbols may have a different pilot pattern than the payload bearing OFDM symbols of the frame.

OFDM Network

Figure 1:
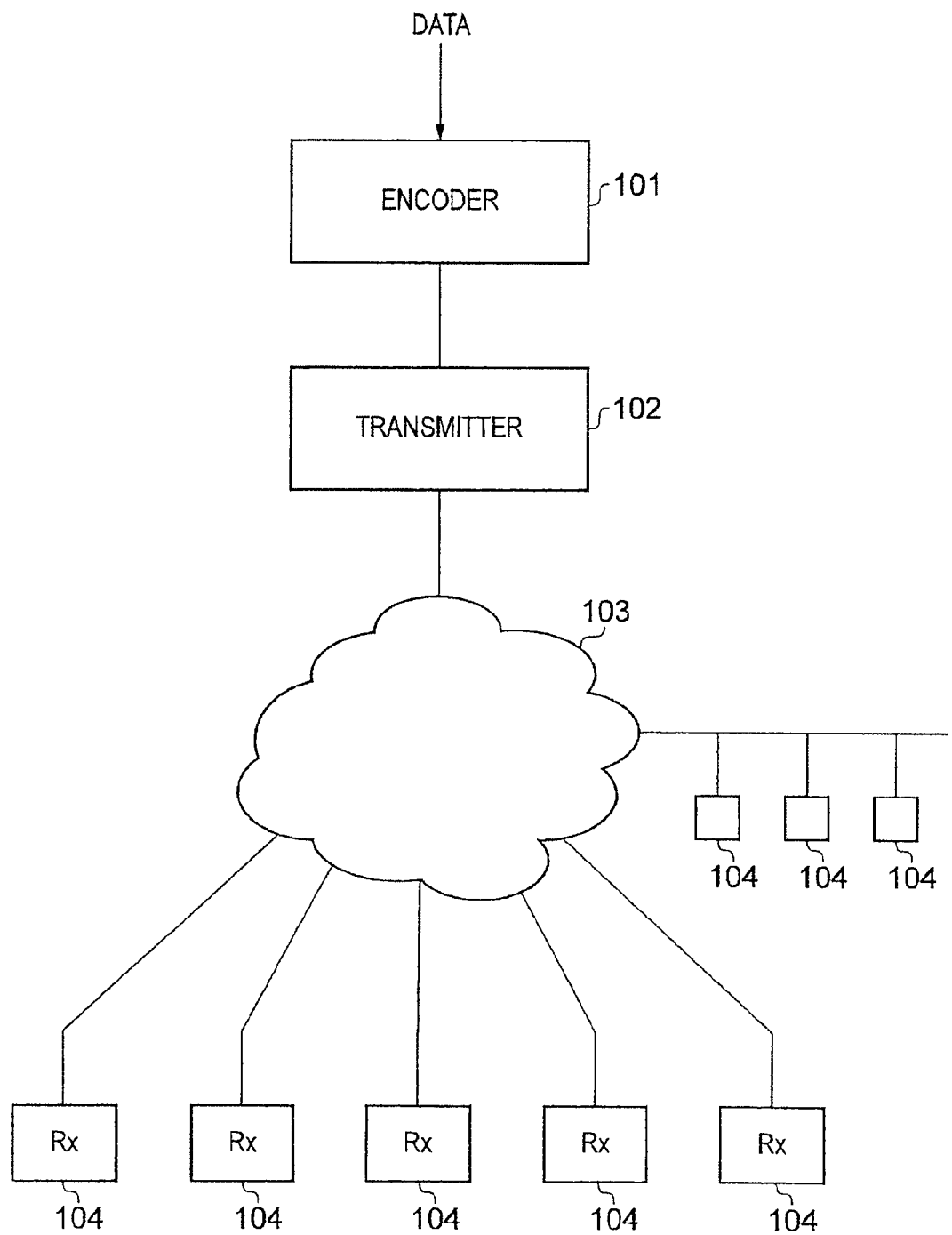
FIG. 1 provides a schematic diagram of a conventional OFDM communication network.

FIG. 1 provides an example block diagram of a typical OFDM network for transmitting data such as video images and audio signals in accordance with the DVB suite of OFDM standards such as DVB-T, DVB-H, DVB-T2 and in particular DVB-C2. In FIG. 1 data is received by an encoder 101. The encoder 101 encodes the data and then outputs the encoded data as a series of OFDM symbols. The encoding process includes applying interleaving and forward error correction to the data and then forming an OFDM symbol by inserting the data on the sub-carriers. The data includes pilot data as described above. Each OFDM symbol is then transformed into a time domain OFDM signal and a guard interval is added. The time domain OFDM signal is then output to a transmitter 102. The transmitter 102 combines the time domain OFDM signal with a carrier signal forming a transmission signal and transmits this across a channel 103. The nature of the channel 103 will depend on the type of OFDM standard being used and the infrastructure of the OFDM network. For example, the channel 103 may be a radio channel or may be a fix-wired data distribution network of a multimedia content provider. Once the transmission signal has been transmitted across the channel 103, it is received by one or a plurality of receivers 104. The receivers 104 will receive the transmitted signal in a manner depending on the nature of the network. For example, the receivers 104 may receive the transmission signal via a cable interface connected to the network of a multimedia content provider by a domestic telephone line or a link to a fibre optic network, or they may receive the transmitted signal using a radio signal reception interface.

OFDM Transmitter

Figure 2:
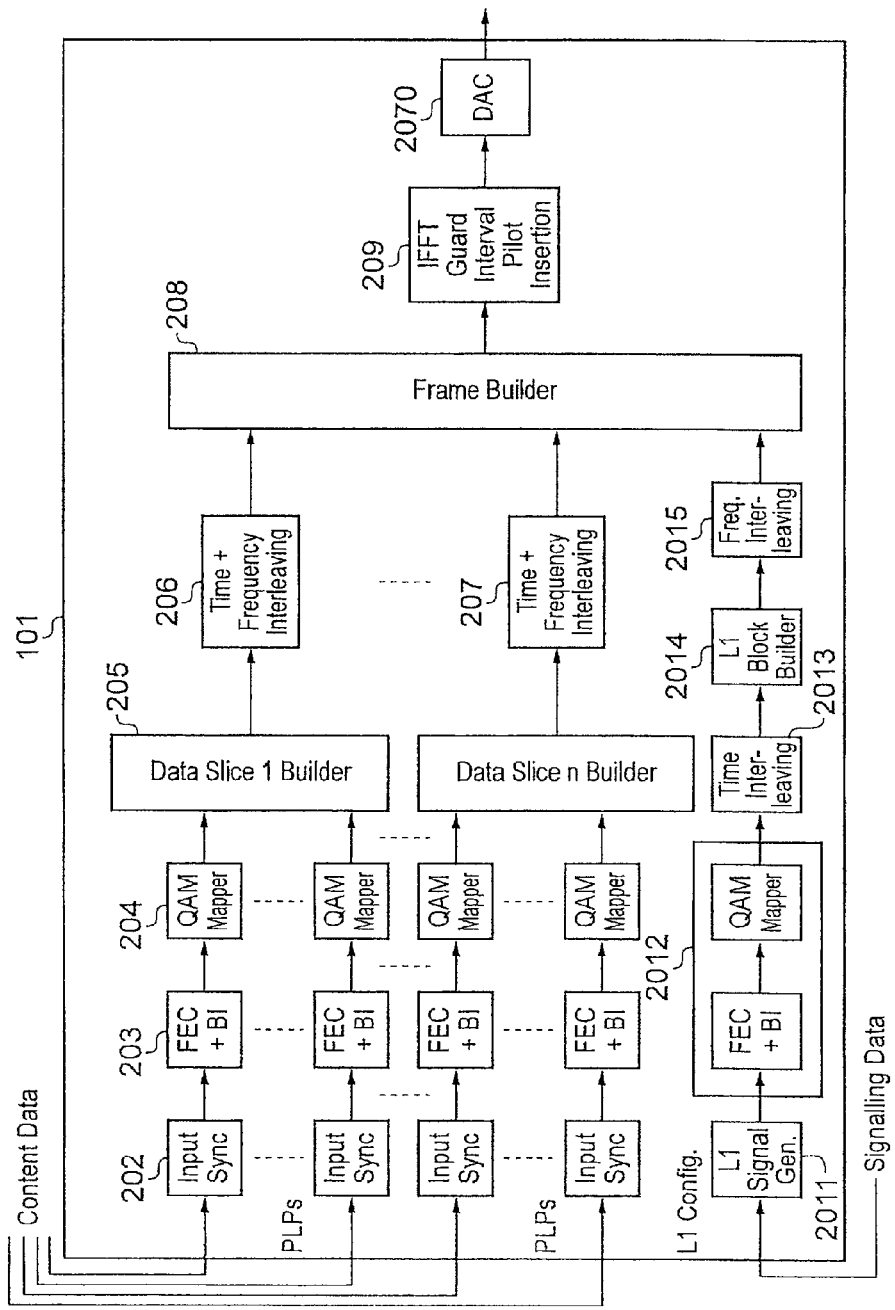
FIG. 2 provides a schematic diagram of an OFDM encoder as used in the DVB-C2 system.

FIG. 2 provides a more detailed diagram of the encoder 101. The encoder 101 receives input data which includes signalling data and content data. The signalling data includes signalling information used to control the transmission of data across the network and provide information for the receivers 104 which is used when receiving and demodulating the transmitted OFDM symbols. The content data includes data relating to the content to be extracted at the receiver. This typically includes audio and video data but may include other data as well. In some examples, the content data can be divided into logical channels referred to as Physical Layer Pipes (PLPs). Each PLP can be encoded separately.

After being input to the encoder 101, the content data is synchronised by an input synchroniser unit 202. The input synchroniser unit 202 ensures a constant bit rate into the encoder 101 and compensates for end-to-end transmission delay for differing input data formats. The synchronised input data is then subject to error correction and interleaving by a forward error corrector and bit interleaving unit 203. The data is then mapped onto an appropriate quadrature amplitude multiplex (QAM) constellation by a QAM mapper 204. The various encoded PLP data stream are then formed into a series of data slices by a number of data slice builders 205. The various data slices are then time and frequency interleaved by a plurality of time and frequency interleavers 206, 207 and constructed into a transmission frame by a frame builder 208 (the format of the transmission frame including data slices is explained further below). The transmission frame output from the frame builder 208 then has pilot data inserted, undergoes an inverse frequency transform to convert each OFDM symbol of the frame into a time domain signal and has a guard interval inserted by inverse frequency transform encoding block 209. The output time domain signal then undergoes digital to analogue conversion by a digital to analogue converter 2010 and is output to the transmitter 102.

The signalling data undergoes different encoding to the content data. Input signalling data is formed into layer 1 (L1) signalling data at the L1 signalling generator 2011. The generated L1 signalling data is then subject to forward error correction and bit interleaving by an L1 forward error correction and bit interleaving unit 2012. The bit interleaved and forward error corrected L1 signal is then time interleaved by time interleaver 2013 and formed into an L1 block by L1 block builder 2014. The formation of the L1 block is explained in more detail below. The signalling data in the L1 block is then frequency interleaved by a frequency interleaver 2015 and enters the frame builder 208 to be combined into a frame along with the content data.

DVB-C2 Physical Layer Frame

Figure 3:
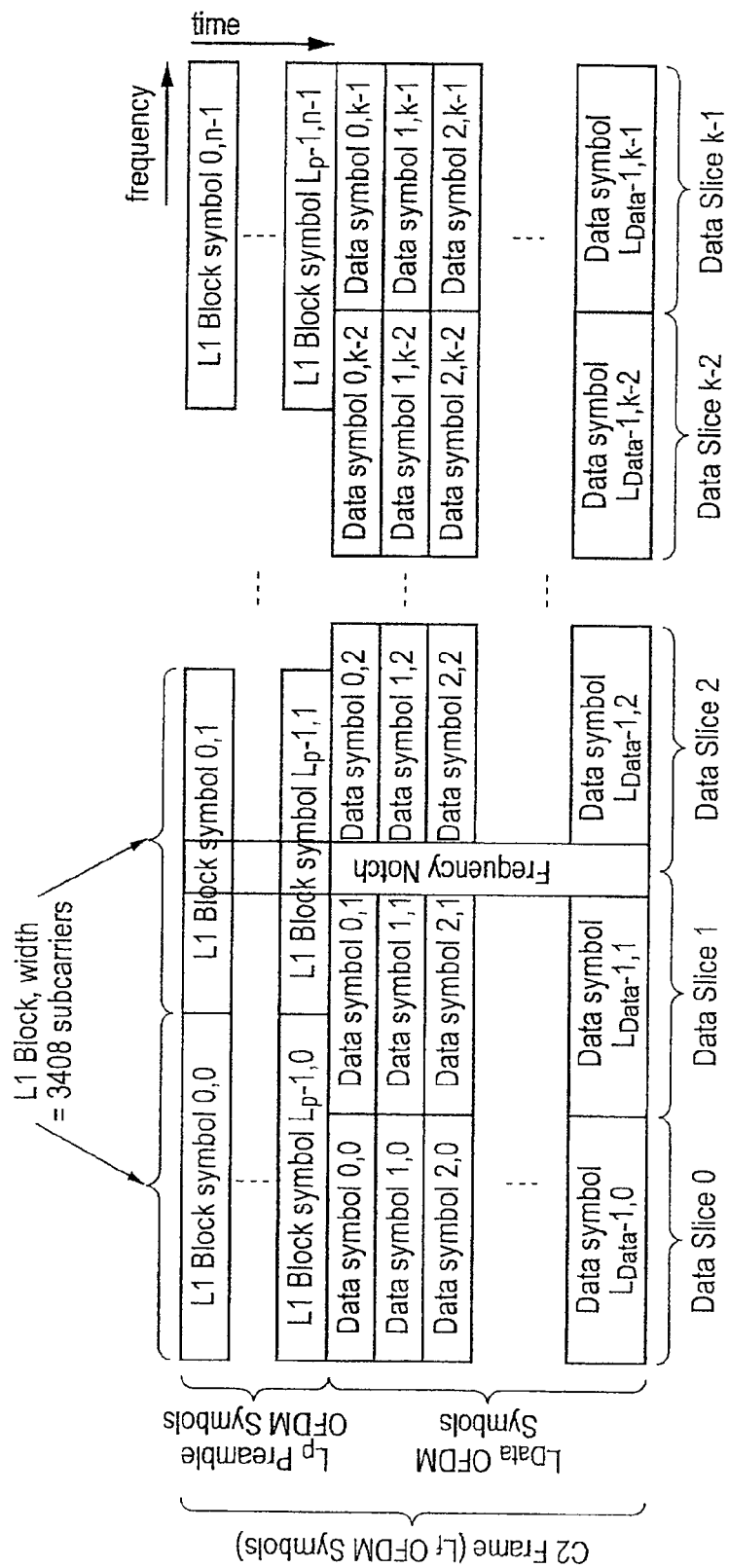
FIG. 3 provides a schematic diagram of an OFDM DVB-C2 frame structure.

FIG. 3 provides a schematic diagram illustrating the structure of a DVB-C2 physical layer frame which may be output from the frame builder 208. As shown in FIG. 3, a DVB-C2 frame starts with $L_p$ preamble OFDM symbols which are then followed by $L_{Data}$ payload OFDM symbols. $L_{Data}$ typically=448. Each OFDM symbol typically has 3408 active sub-carriers which can be allocated to pilot data, "data slices" and "notches".

"Data slices" are groups of sub-carriers within each OFDM symbol derived from content data streams input into each data slice builder 205. The number of active sub-carriers that can be allocated to a data slice is variable with a granularity determined by the pilot pattern being used i.e. a data slice width must be a multiple of the pilot sub-carrier spacing ($D_x$).

"Notches" are a number of adjacent sub-carriers within each OFDM symbol which are intended to accommodate for regions of the frequency spectrum that are likely to be subject to narrow band interference. Such interference may arise due to domestic power supplies and so on. Sub-carriers within a notch therefore do not carry any data that need be decoded by the receiver.

In DVB-C2, each preamble symbol typically has a sub-carrier pilot pattern of $D_x=6$ and $D_y=1$ whilst data symbols can have a sub-carrier pilot pattern with $D_x=12$ and $D_y=4$ or $D_x=24$ or $D_y=4$ corresponding to a guard interval of 1/64 or 1/128 respectively. Pilots are modulated by a PN sequence similar to DVB-T/T2. Each symbol has a duration Ts=Tu+Tg where Tu is the useful symbol duration and Tg is the guard interval duration being Tu/64 or Tu/128.

Figure 4:
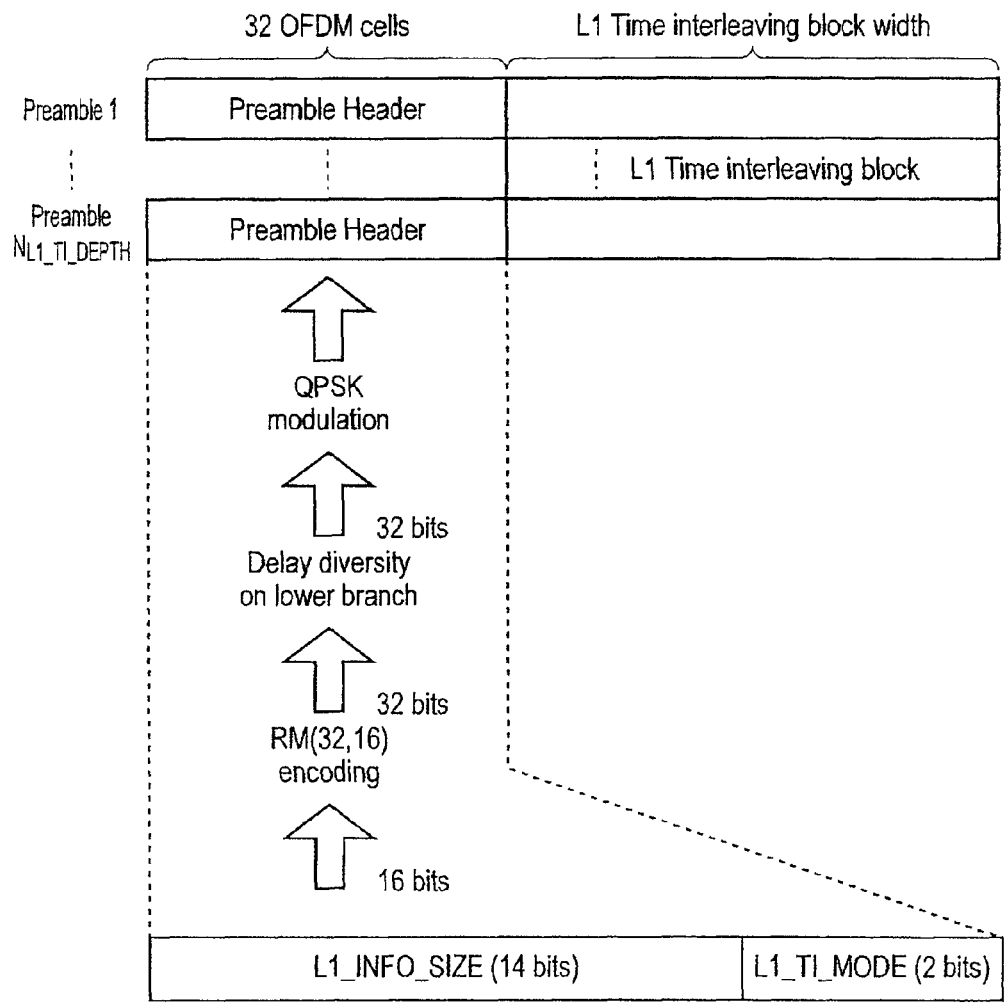
FIG. 4 provides a schematic diagram showing the construction of an OFDM DVB-C2 header.
Figure 5:
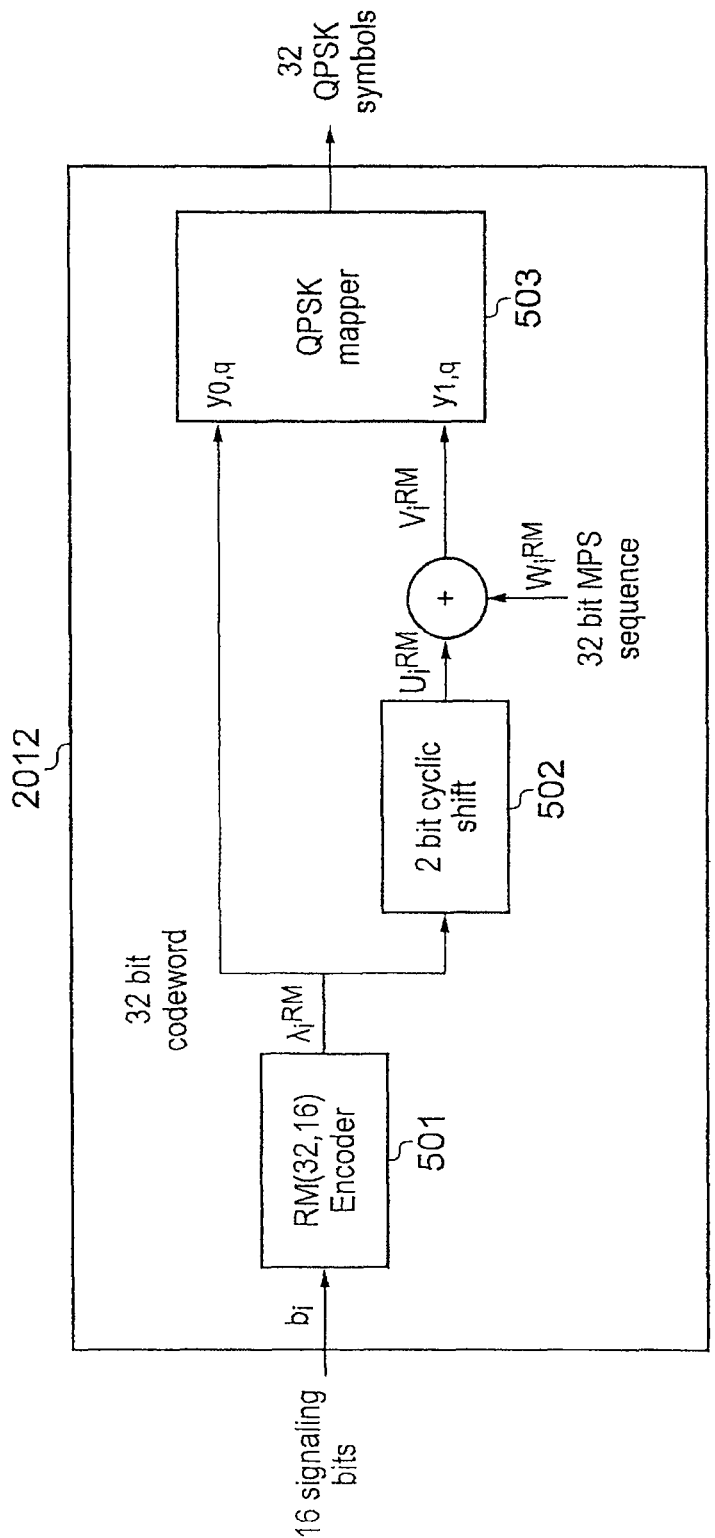
FIG. 5 provides a schematic diagram of an L1 forward error correction and modulation unit.

FIG. 4 provides a schematic diagram illustrating in more detail the process by which DVB-C2 preamble OFDM symbols are constructed within the encoder 101. Each preamble symbol is composed of a 32 sub-carrier preamble header which carries some Layer 1 signalling information. All preamble symbols at the start of a given frame have identical headers. FIG. 5 provides a schematic diagram of the L1 forward error correction and modulation unit 2012 which illustrates in more detail the way in which preamble headers may be generated.

Firstly, sixteen signalling bits from the L1 signalling generator 2011 are encoded by a Reed Muller encoder 501 with a half rate Reed-Muller (32, 16) code to give 32 bits. These bits are then processed in two ways. A first copy goes directly to a QPSK mapper 503 whilst the second copy goes through a 2-bit cycle left shifter 502. This produces a sequence:

$$u_i = \lambda((i+2) \bmod 32) \text{ for } i=0,1,\ldots 31.$$

where $\lambda$, is the output sequence of the Reed-Muller encoder 501. The sequence u is then scrambled with a 32 bit scrambling sequence w to provide the sequence v. That is:

$$v_i = u_i \oplus w_i \text{ for } i=0,1,\ldots 31.$$

The QPSK mapper 503 pairs up the bits of the sequences $\lambda$ and $v$ such that $\lambda$ provides the most significant bit and $v$ provides the least significant bit into QPSK symbol labels ready for modulation onto the first thirty two non-pilot sub-carriers of each preamble OFDM symbol of the current frame.

Receiver

Figure 6:
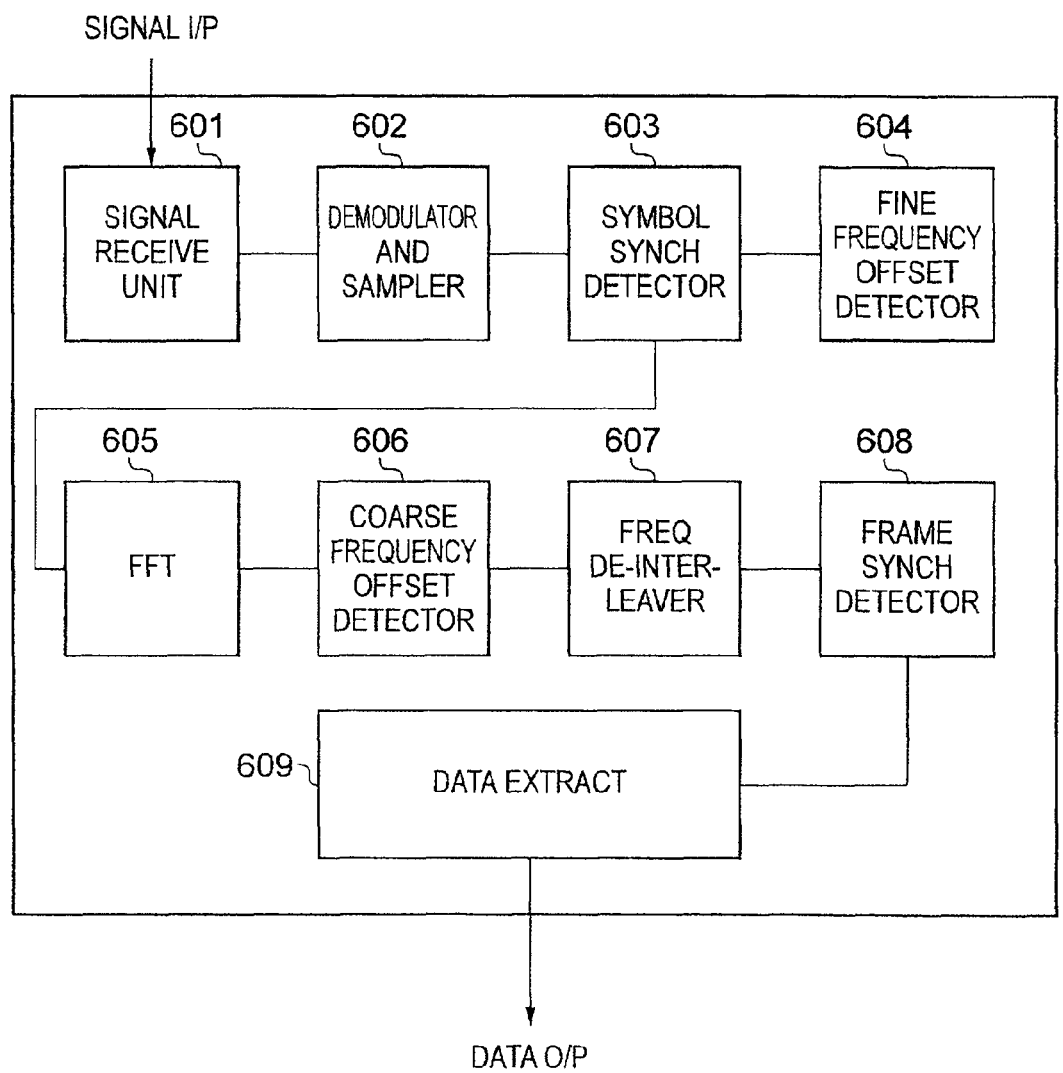
FIG. 6 provides a schematic diagram showing functional blocks or stages of an OFDM receiver.

Once the OFDM signal has been transmitted as a transmission signal via the channel 103 it is received by a receiver 104. FIG. 6 provides a schematic diagram illustrating the functional blocks of the receiver 104. For the sake of brevity, only functional blocks pertinent to the present invention are discussed. However, it will be appreciated that the receiver will include other functional elements associated with conventional OFDM receivers such as channel estimation and correction units.

The receiver shown in FIG. 6 includes a signal receive unit 601 for receiving the transmission signal. As explained above, the signal receive unit 601 will depend on the nature of the transmission signal. In some examples it may be a radio interface. In the example of DVB-C2 it may be a cable interface connecting to a cable service provider's data distribution network.

The received transmission signal is demodulated and sampled by demodulator and sampler 602 to extract a sampled time domain OFDM signal from the carrier signal. The time domain OFDM signal is then input to a symbol synchronisation detector 603 which is arranged to identify an optimum point for extracting samples of each OFDM symbol which have most useful energy in the time domain for triggering the Fourier transform. A symbol synchronisation time is thus generated. As will be explained below, the symbol synchronisation time is used to select a part of the OFDM time domain signal on which to apply a frequency transform operation. This is typically achieved by detecting the guard interval which separates each symbol. Once the symbol synchronisation detector 603 has identified the OFDM symbol boundaries in the time domain and generated a symbol synchronisation time, the symbol synchronisation time is further refined by a fine frequency offset detector 604. The fine frequency offset detector 604 is arranged to remove any frequency offset errors up to +/−½ of the frequency width of a sub-carrier. Once the symbol synchronisation time has been processed and the fine frequency offset detector 604 used to correct for fine frequency offsets, the time domain OFDM signal is processed by a fast Fourier transform (FFT) processor 605. The FFT processor 605 applies a frequency transform to a section of the time domain OFDM signal which converts this section back into the OFDM symbol in the frequency domain. The start point of the section, referred to as an FFT window, is determined using the symbol synchronisation time generated by the symbol synchronisation detector 602. The transformed OFDM symbol is then processed by a coarse frequency offset detector 606. The coarse frequency offset detector 606 is arranged to detect sub-carrier positional frequency offset errors which are a multiple of the frequency width of a sub-carrier. The coarse frequency offset detector 606 can be arranged to detect such frequency offset errors by using the position of pilot sub-carriers in the OFDM symbol.

When the OFDM symbol has been corrected for coarse frequency errors, the OFDM symbol is de-interleaved by a frequency de-interleaver 607 and then processed by a frame synchronisation detector 608 arranged to detect boundaries between OFDM frames and thus the position of the OFDM symbol within the OFDM frame. Once the frame synchronisation has been established, data can be extracted from the sub-carriers of the OFDM symbol in accordance with the frame structure. This is undertaken by various components but is represented in FIG. 6 generally by a data extractor 609. Once the data has been extracted it can be used appropriately in the receiver. For example, signalling data can be used to provide further information necessary for the processing of the received data and content data can be decoded and output, for example as audio and video signals Various parts within the receiver 104 will now be explained in more detail with reference to FIGS. 7 to 17.

Symbol Synchronisation Detector

As mentioned above, a symbol synchronisation time must be determined to position the start of the FFT window. In order to do this, the OFDM symbol boundaries (i.e. a position in the time domain OFDM signal from which an optimum frequency transform can be applied) must be identified in the time domain OFDM signal. In the time domain, each OFDM symbol is preceded by a guard interval which is filled with a copy of the last Ng samples of the OFDM symbol—a so-called cyclic prefix. Symbol boundaries can therefore be acquired from the time domain OFDM signal by identifying the presence of a guard interval. Since the samples of the guard interval appear twice for each OFDM symbol, a correlator can be used to identify the position of the guard interval in the time domain OFDM signal. In DVB-C2, OFDM symbols have one of two possible guard lengths. The symbol synchronisation detector 603 therefore has two tasks: to find the duration of the guard interval; and to determine an optimal symbol synchronisation time to begin the FFT window.

Figure 7:
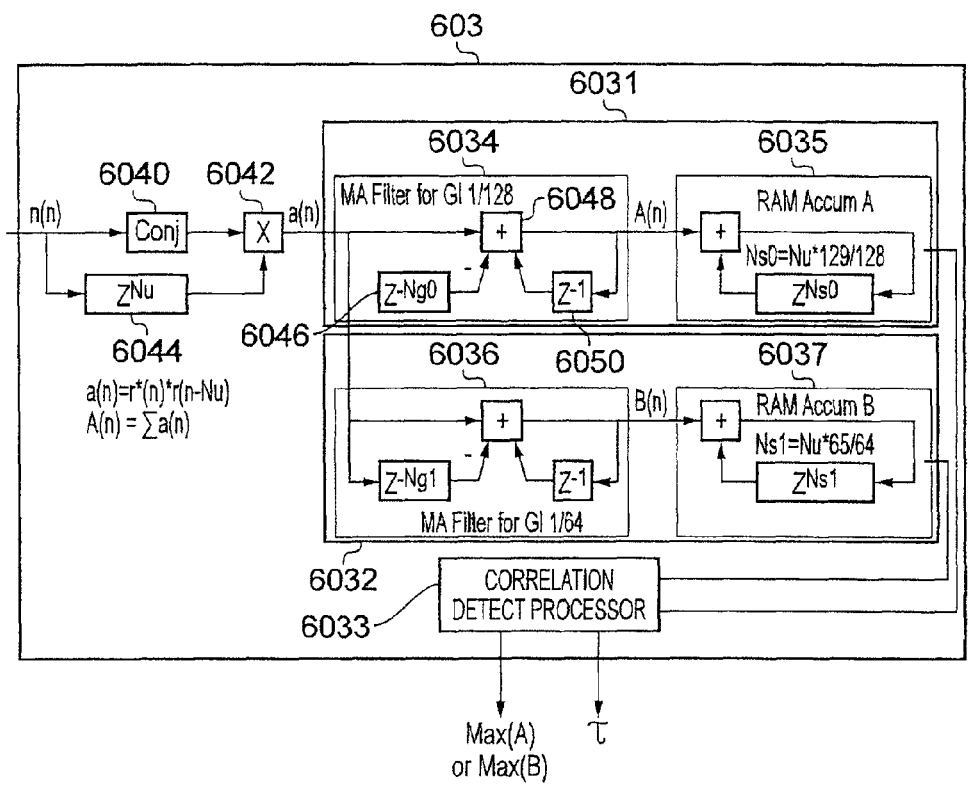
FIG. 7 provides a schematic diagram showing a symbol synchronisation unit arranged in accordance with an embodiment of the present invention.

FIG. 7 provides a schematic diagram showing a symbol synchronisation detector 603 arranged in accordance with an embodiment of the present invention. The symbol synchronisation detector 603 comprises two correlators. The first correlator 6031 is arranged to correlate the time domain OFDM signal in accordance with a guard interval of 1/64. In other words, the first correlator 6031 is arranged to look for an auto correlation within the OFDM time domain signal of length $T_u/64$ indicating the presence of a 1/64 guard interval. The second correlator 6032 is arranged to correlate the time domain OFDM signal in accordance with a guard interval of 1/128. In other words, the second correlator 6032 is arranged to look for an auto correlation within the OFDM time domain signal of length $T_u/128$ indicating the presence of a 1/128 guard interval. The first and second correlators run concurrently in parallel.

The symbol synchronisation detector 603 shown in FIG. 7 is arranged in accordance with the DVB-C2 standard which as mentioned above provides only two possible guard lengths. However, it will be appreciated that the symbol synchronisation detector 603 could be arranged with more correlators for an OFDM scheme employing more than two guard interval lengths.

Each correlator includes a matching filter 6034, 6036 and accumulator memory 6035, 6037. The matching filter 6034 of the first correlator is arranged to output a signal which increases in level the more closely sections of the input OFDM signal of a length $T_u/64$, matches with itself. The accumulator memory 6035 accumulates the output of the matching filter. The operation of the matching filter 6035 and the accumulator memory 6037 from the second correlator 6032 run in parallel to this and are the same except that the matching filter 6036 outputs a signal which increases in size the more closely sections of the input OFDM signal of a length $T_u/128$, matches with itself.

The initial input sequence of samples r(n) from the demodulator and sampler 602 is input to a complex conjugator 6040 and a first delay 6044. The output of the complex conjugator 6040 and the delay 6044 are multiplied by a multiplier 6044 forming an output stream a(n). The sequence a(n) is input to each matching filter 6032, 6034 where it is delayed by a second delay 6046, and subtracted with a(n) by an adder 6048 and a delayed version of a(n) provided by a third delay 6050. The output of the matched filter 6032 is then designated either A(n) or B(n) for the first and second matched filters respectively.

Specifically, the first correlator 6031 implements the following equation (where * denotes a complex conjugation operation):

$$A_m(n) = \sum_{i=0}^{N_{g0}} r*(n-i)r(n-N_u-i)$$

where $N_{g0} = 4096/128 = 32$

And the second correlator 6032 implements the following equation:

$$B_m(n) = \sum_{i=0}^{N_{g1}} r*(n-i)r(n-N_u-i)$$

where $N_{g1} = 4096/64 = 64$

The accumulator memories 6035, 6037 then execute an element-by-element accumulation of the vectors $A_m(n)$ and $B_m(n)$ for n=0, 1, 2 . . . $N_s$, where $N_s$=4128 for the first correlator 6031; and $N_s$=4160 for the second correlator 6032) and m is the OFDM symbol index.

Figure 8:
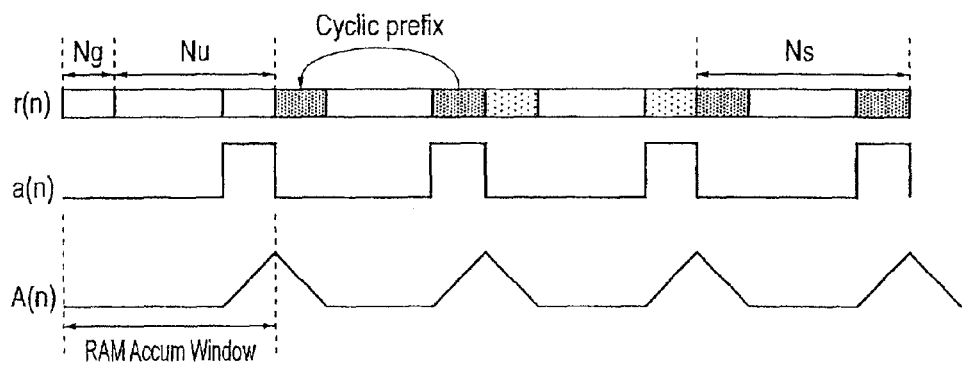
FIG. 8 provides a schematic diagram indicating idealised traces of signals that flow at particular points in the symbol synchronisation detection unit shown in FIG. 7.

FIG. 8 provides a schematic diagram indicating idealised traces of the signals r(n), a(n) and A(n) that flow at particular points in symbol synchronisation detection unit 603 shown in FIG. 7.

Returning to FIG. 7, the accumulator memories 6035 and 6037 of the first and second correlators are monitored by a correlation detection processor 6033. Because the output of each matching filter increases in level when it detects the guard interval length it is arranged to detect, the accumulator memory storing the greatest value indicates the length of the guard interval for a given received OFDM time domain signal. For example if the accumulator memory 6035 of the first correlator 6031 has the highest value after a set number of symbol times, this indicates that the OFDM time domain signal has a guard interval of $T_u/128$.

In some examples, the correlation detect processor 6033 may wait for a given period of time and then determine the guard interval based on the accumulator memory with the highest value. Alternatively, the correlation detect processor 6033 may instead wait until one of the accumulator memories reaches a threshold value.

In one example, after a given number $L_{sync}$ OFDM symbols (each of length Ns=4160 in the example of DVB-C2), the correlation detect processor 6033 detects which accumulator memory gives a higher peak correlation value. The guard interval length Ng is then decided:

$$N_g = \begin{cases} 64 \text{ if } \max(B) > \max(A) \\ 32 \text{ if } \max(A) \geq \max(B) \end{cases}$$

In another example, both correlators are run until either max(A) or max(B) exceeds a given threshold. Then the corresponding $N_g$ (i.e. guard interval length) is chosen. The corresponding accumulator memory is then reset and the selected branch run again for $L_{sync}$ OFDM symbols.

The correlation detect processor 6033 is arranged to use the time at which the guard interval of the determined length has been detected to determine the symbol synchronisation time that the FFT processor 605 can use to set the start time of the FFT window.

In one example, the symbol start time τ can be derived by implementing the following equation if the second accumulator memory 6037 has the greater value:

τ=Index(max(B))mod $N_s$.

Or, if the first accumulator memory 6035 is detected as having the greater value, the correlation detector processor 6033 resets the first accumulator memory 6035 and controls the first correlator 6031 to run for another $L_{sync}$ symbols of length $N_s$=4128. The symbol synch time τ is then calculated as being τ=Index(max(A))mod $N_s$.

Accordingly the correlation detect processor 6033 is arranged to output the symbol synch time τ.

Figure 9A:
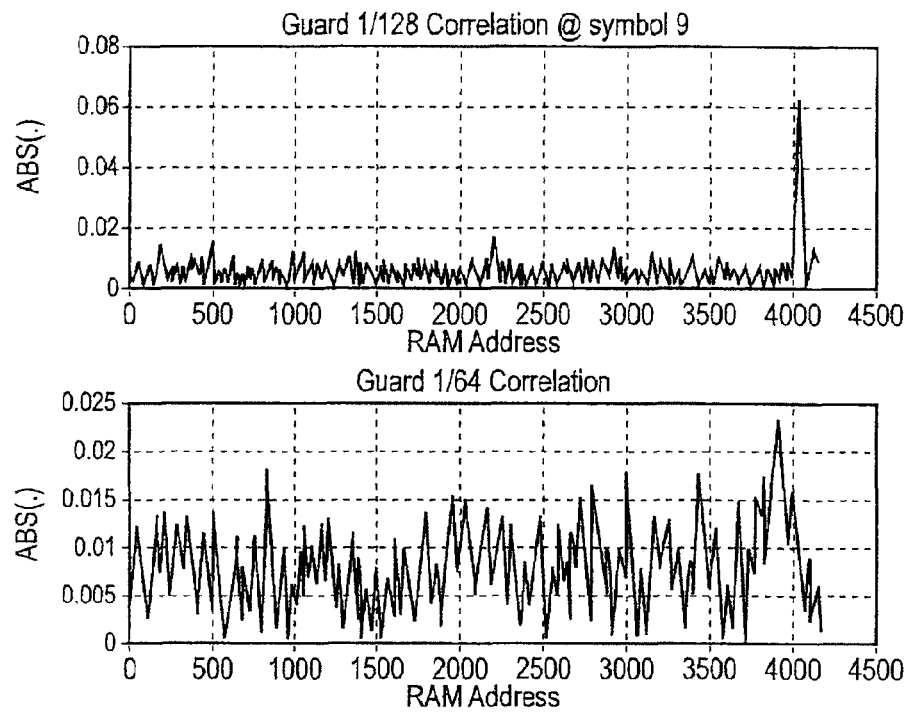
FIGS. 9a and 9b provide an illustration of graphs indicating a result of a first and second stage of correlation undertaken by correlation units in the symbol synchronisation detection unit shown in FIG. 7.

FIG. 9a provides an illustration of two graphs indicating the result of the first stage of correlation for the first correlator 6031 and the second correlator 6032 in which max(A)>max (B) after averaging over 10 OFDM symbols. This is for a transmission system using the 1/128 guard interval.

Figure 9B:
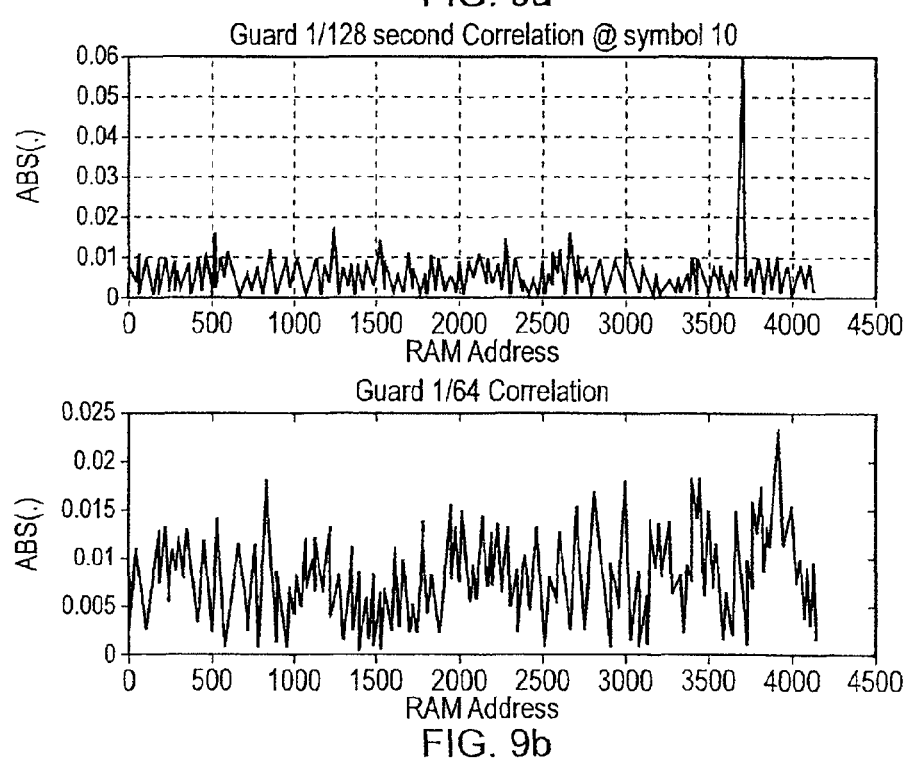

FIG. 9b provides an illustration of two graphs indicating values of the contents of the first accumulator memory 6035 after reset and subsequent averaging over 10 OFDM symbols.

Fine Frequency Offset

As mentioned above, the fine frequency offset detector 604 is arranged to determine a fine frequency offset error Ω. In some examples this can be determined by implementing the following equation:

Ω=arg(max(A))

if the first accumulator memory 6035 is detected as having the greater value, or Ω=arg(max(B))

if the second accumulator memory 6037 is detected as having the greater value.

Accordingly, the output of the correlation detect processor 6033 in the symbol synchronisation detector which is input into the fine frequency offset detector 604 includes max(A) or max(B) depending on which guard length interval is detected.

Coarse Frequency Offset

As described above, the guard interval correlation used to acquire the OFDM symbol boundary also provides the fine (i.e. sub-FFT bin) frequency offset. This precludes frequency offsets that are a multiple of one FFT bin (i.e. sub-carrier width in frequency domain). In other words, the sub-carriers of the OFDM symbol may be displaced in the frequency domain by one or more sub-carrier positions with respect to an original position within the OFDM symbol which they occupied prior to transmission. Such displacement amounts to a "coarse" frequency offset of the sub-carriers of the frequency transformed OFDM symbol and may arise for various reasons such as errors in the de-modulation process or errors imposed on the transmission signal by channel conditions. In the presence of such frequency offsets, data on a sub-carrier of the OFDM symbol originally transmitted in bin number (i.e. sub-carrier number) k would actually be located in bin number k±ω where ω is the multiple and the actual frequency offset being ωΔf where Δf in Hertz is the bandwidth of each FFT bin. Thus ω has to be estimated in order determine the coarse frequency offset.

Figure 10:
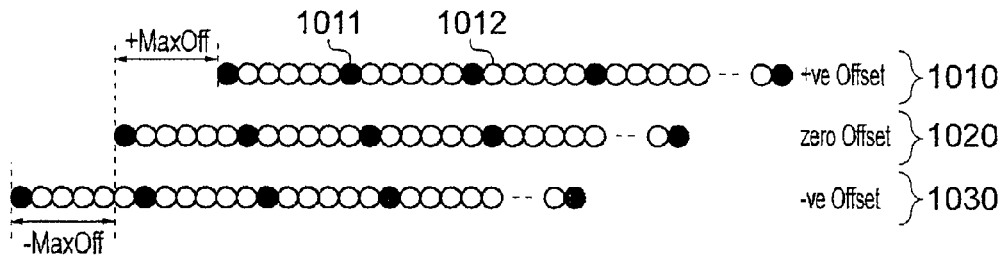
FIG. 10 provides an illustration of a technique of detecting a coarse frequency offset of frequency transformed OFDM symbols.

In one example in accordance with DVB-C2, for each preamble symbol, between the upper or lower edge of a tuned rasta channel and the first useful OFDM sub-carrier, 344 (i.e. (4096−3408)/2) sub-carriers are set to zero at the transmitter. This means that potentially a coarse frequency offset of $\omega=344$ can be accommodated. In each DVB-C2 preamble symbol, pilot sub-carriers occur every 6th sub-carrier. The pilot sub-carriers are modulated with a unique random sequence known both at the transmitter and the receiver. After performing the FFT on the preamble symbol in the receiver, this sequence can be located within the OFDM symbol by matching the expected pilot sub-carrier sequence with sub-carriers at the appropriate locations in the frequency spectrum. FIG. 10 illustrates a technique to detect the coarse frequency offset.

In FIG. 10, a first row of circles 1010 represents an OFDM symbol comprising sub-carriers with a maximum positive offset. The shaded circles 1011 represent preamble pilot sub-carriers whilst the un-shaded circles 1012 represent non-pilot sub-carriers. A second row of circles 1020 represents an OFDM symbol of sub-carriers with a zero offset. A third row of circles 1012 represents an OFDM symbol of sub-carriers with a maximum negative offset. The maximum positive and negative offsets are parameters that represent a maximum value of $\omega$ that is expected.

In order to determine the coarse frequency offset once the OFDM signal has undergone the FFT and the OFDM symbol has been recovered in the frequency domain, all of the OFDM symbol sub-carriers are shifted from right to left through a pilot data filter. The output of the pilot data filter will then peak when the position of the pilot sub-carriers is detected. Accordingly the coarse frequency offset can be calculated.

Figure 11:
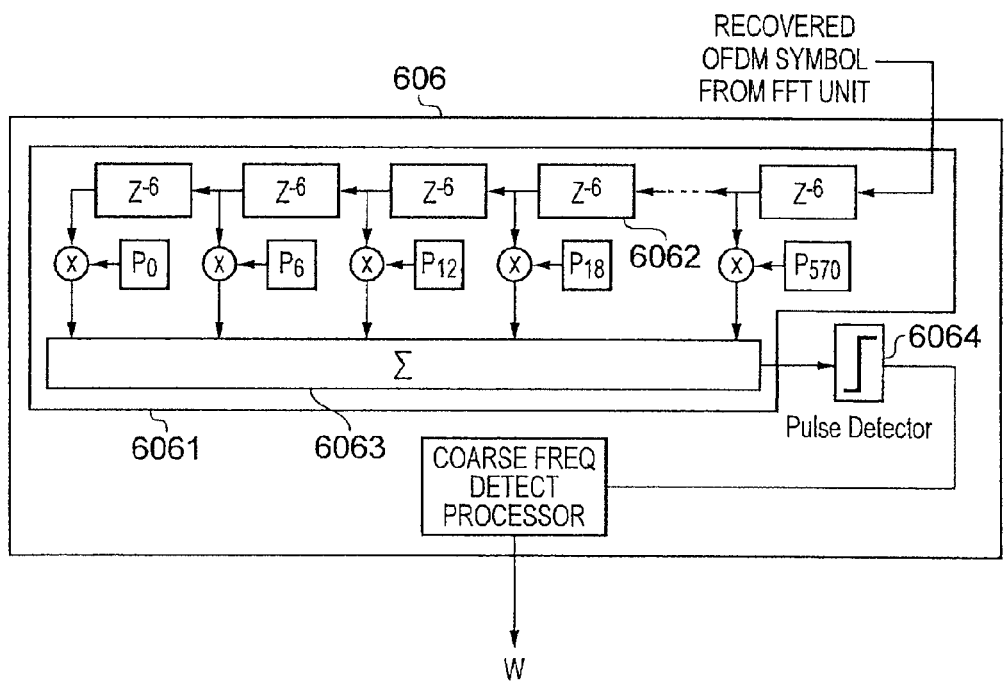
FIG. 11 provides a schematic diagram of a coarse frequency offset detector arranged to implement the technique illustrated in FIG. 10.

FIG. 11 provides a schematic diagram showing an implementation of the coarse frequency offset detector 606 arranged to perform this technique. The input of the coarse frequency offset detector is the OFDM symbol recovered from the OFDM time domain signal by the FFT processor 605. The coarse frequency offset detector 606 includes a pilot data filter 6061. The pilot data filter 6061 has a delay stage 6062 for each pilot sub-carrier. As mentioned above, the pilot sub-carriers of the preamble symbol are modulated with a unique random sequence known both at the transmitter and the receiver. The output taps of each delay stage are scaled with a value ($P_0$ to $P_{570}$ for DVB-C2) corresponding to this random sequence. The output of these combinations are then summed by a summation unit 6063 within the pilot data filter 6061. A pulse detector 6064 monitors the output of the pilot data filter 6061. When a pulse is detected, the unique sequence of pilot sub-carriers is detected. A signal is then sent to a coarse frequency detect processor which determines from the time of the pulse a value for the coarse frequency offset $\omega$.

In some examples, the output of the pulse detector is only valid between offsets of 3408+(343−Max Offset) and 4096−(344−Max Offset). Thus if the maximum expected frequency offset is ±200Δf i.e. Max Offset=200, then the pulse detector output will be valid from shift 3551 to shift 3952 i.e. (3952−3551)=a total offset of 401 FFT bins. If a shift of an FFT bin is numbered from −Max Offset to +Max Offset then the pulse detector output will go high for the shift that corresponds to the observed frequency offset.

Figure 12:
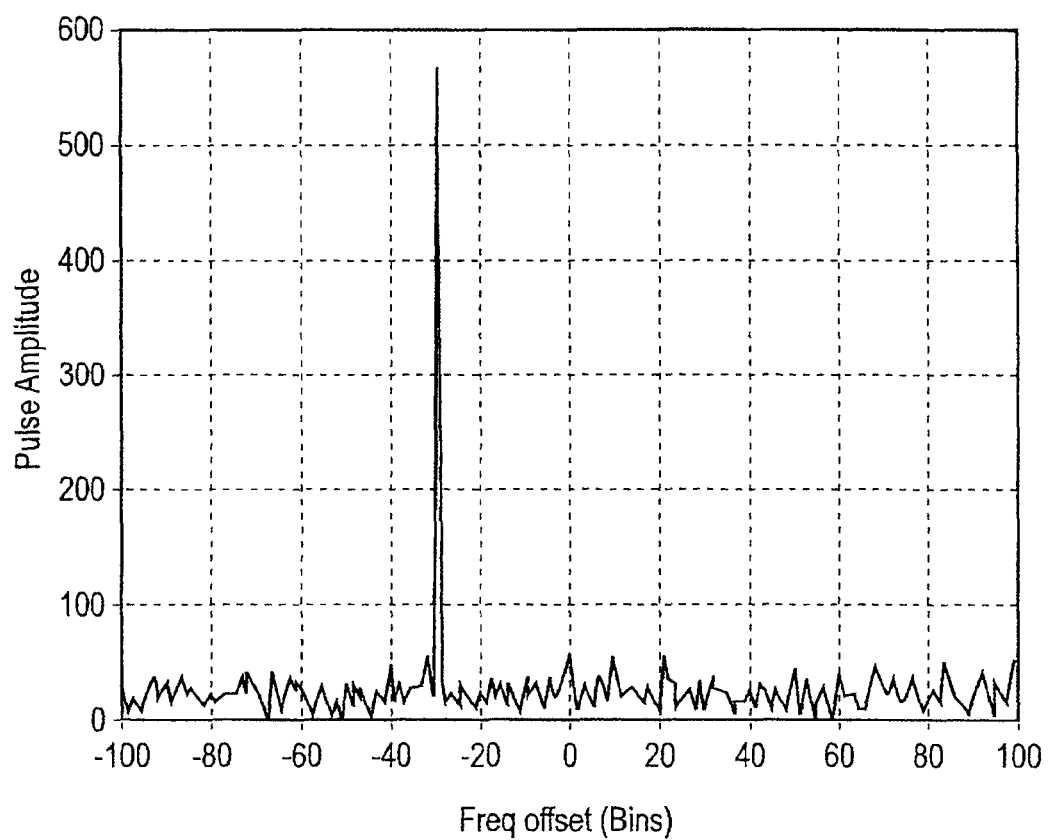
FIG. 12 provides an illustration of a graph showing an input of a pulse detector of the coarse frequency offset detector shown in FIG. 11.

FIG. 12 provides an example plot of the input of the pulse detector 6064 for a frequency offset of $\omega=-30$ FFT bins in a case where the Max Offset is set to 100. In some examples the pulse detector 6064 might use a threshold to clip this input as a detection of the presence (or absence) of a substantial pulse.

Frame Acquisition

As explained above, after correcting for the coarse frequency offset, the next stage is frame acquisition undertaken by the frame synchronisation detector 608. The function of the frame synchronisation detector 608 is to find the boundary of each OFDM frame by detecting which of the received OFDM symbols are preamble OFDM symbols found at the beginning of each OFDM frame.

The detection of the coarse frequency offset detailed above is based on the detection of pilot sub-carriers from the preamble OFDM symbol. It is therefore known that the OFDM symbol on which the frequency offset is detected is a preamble OFDM symbol. However, if there are more than one preamble OFDM symbols per frame (i.e. Lp>1) then the relative position of this preamble OFDM symbol in the set of preamble OFDM symbols of the current frame is not known. Accordingly, frame acquisition cannot be derived directly from the process of acquiring the coarse frequency offset value $\omega$.

Preamble Pilot Correlation

In a first example, the beginning of a frame can be detected by attempting to identify the first occurrence of a preamble pilot sub-carrier correlation corresponding to the frame boundary. Therefore, in a similar way to the frequency offset estimation implemented in the coarse frequency offset detector 606, preamble pilot sub-carrier correlation can be used to acquire the start of the OFDM frame. In this case however, only the zero-th tap of the pilot data filter need be used. The presence of a pulse at the output will indicate that the current symbol is a preamble symbol and the frame is identified as beginning when the first pulse is detected (corresponding to the first preamble symbol). The preamble header can then be decoded to extract the L1_INFO_SIZE signalling data and L1_T1_MODE signalling data prior to decoding of the Layer 1 part 2 information. In this example, the function of the frame synchronisation detector 608 can be performed within the coarse frequency offset detector 606.

Figure 13:
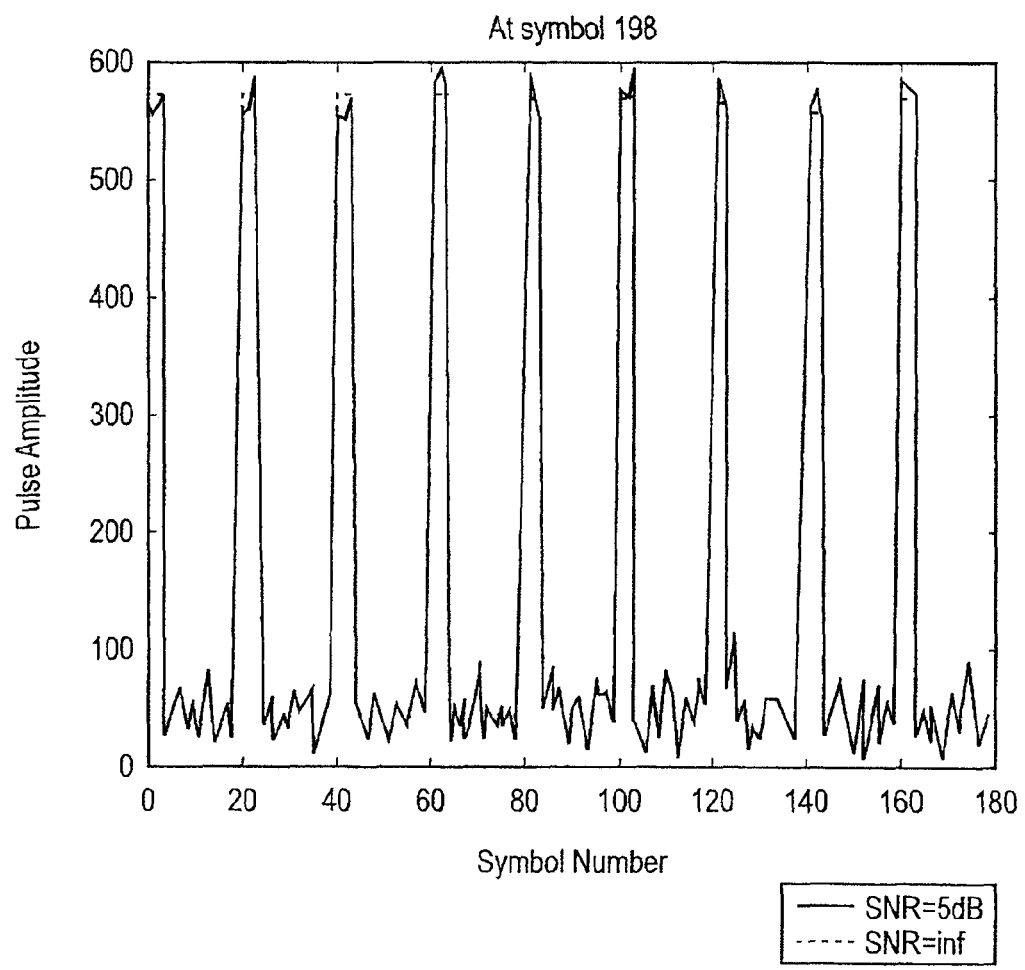
FIG. 13 provides an illustration of a graph of an input of the pulse detector indicating a frame detection.

FIG. 13 provides an illustration of a graph of the input of the pulse detector 6064 for a system in which there are twenty symbols (Lf=20) in a frame and there are four (Lp=4) preamble symbols per frame both in a clear channel and with a signal to noise ratio of 6 dB.

Preamble Header Correlation

In the above example, the beginning of the frame is detected by correlating the known values of the pilot sub-carriers from the preamble OFDM symbol with the received OFDM symbols. However, in another example it is possible to identify the beginning of the frame by identifying the preamble header sequence which is inserted into each preamble OFDM symbol of the frame. As mentioned above, this header sequence is unique to the preamble symbols in each frame.

As explained above, FIGS. 4 and 5 illustrate how the preamble header is constructed and encoded. At the encoder, data to be inserted on the first thirty two sub-carriers of the preamble symbol which carries the header is shuffled with the other L1 part 2 data in a frequency interleaver prior to pilot data insertion. However, in the receiver after each OFDM symbol has been frequency de-interleaved by the frequency de-interleaver 607 the header data is returned to its original position on the first thirty two sub-carriers of the preamble OFDM symbol. Therefore, in one example, preamble header correlation can be achieved by extracting the relevant data from the output of the frequency de-interleaver (i.e. the first thirty two sub-carriers from every OFDM symbol) and reversing the process undertaken by the circuit shown in FIG. 5 to locate the occurrence of the preamble header. Once this has been identified, the frame boundary has been found.

Hard Decision Matching

Figure 14A:
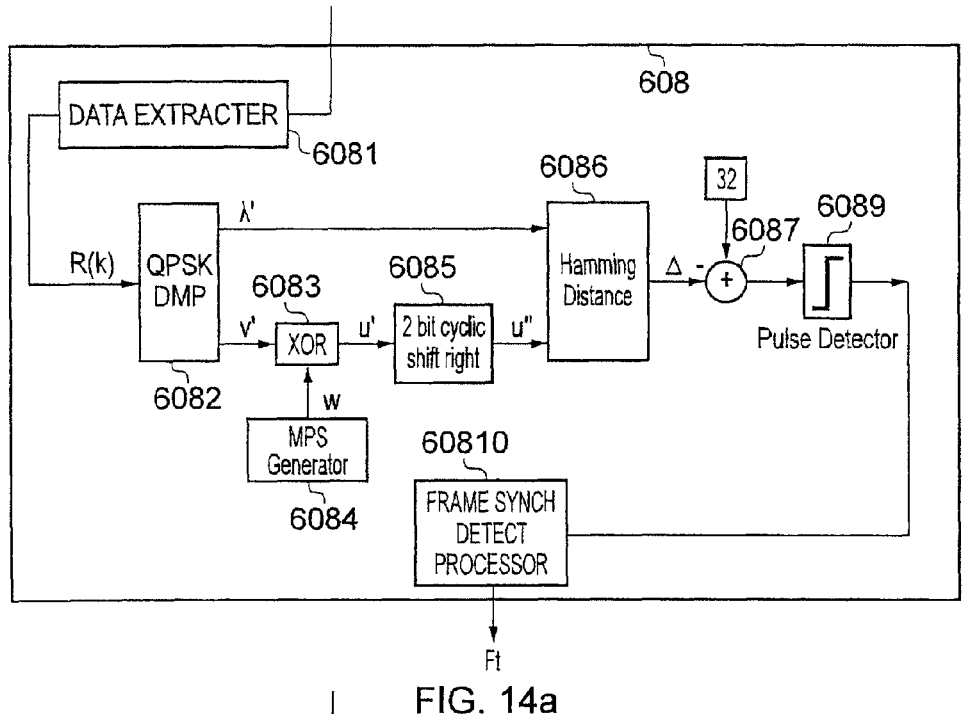
FIGS. 14a and 14b provide schematic diagrams illustrating a first and second implementation of a frame synchronisation detector.

FIG. 14a provides a schematic diagram illustrating a first implementation of the frame synchronisation detector 608 using the header correlation technique described above. The frame synchronisation detector 608 shown in FIG. 14a implements a "hard-decoding" algorithm to detect the preamble header of the OFDM frame (i.e. where absolute binary values are processed to detect the preamble header).

The frame synchronisation detector 608 receives de-interleaved OFDM symbols from the symbol de-interleaver 607. These are then input to a data extractor 6081 which extracts the QPSK data carried on the first thirty two sub-carriers of the symbol, R(k) (k=0, 1, ... 31). This provides an output R(k) which is input to a QPSK de-multiplexer 6082. As shown in FIG. 5, during the construction of the preamble header, two sequences λ and ν are mapped into QPSK labels such that λ provides a sequence corresponding to the most significant bits of the QPSK labels and ν provides the least significant bits of the labels. For example, if λ={0, 1, 1, 0, ...} and ν={0, 0, 1, 1, ...} the resultant QPSK cell labels would be {00, 10, 11, 01, ...}.

The QPSK de-multiplexer 6082 divides the QPSK data into a first stream λ' providing a sequence corresponding to the most significant bits of the demodulated QPSK data, and second stream ν' providing the least significant bits of the de-modulated QPSK data. The bits comprising the second stream ν' undergo an XOR operation with a 32 bit MPS scrambling sequence w provided by a MPS sequence generator 6084 and corresponding to the scrambling sequence used at the encoder. The result of this is a modified stream u' which is then cyclically right shifted by two bits by a cyclic shifter 6085. This provides a further modified stream u".

The first stream λ' and the modified stream u" are then compared in a Hamming distance calculator 6086 to determine a Hamming distance between the two streams. The output of the Hamming distance calculator 6086, Δ, is then subtracted from thirty two by a subtractor 6087. The output of the subtractor is fed into a pulse detector 6089. When the Hamming distance Δ of u" and λ' is at a minimum (indicating that the data from the first thirty two sub-carriers corresponds to the preamble header and the beginning of an OFDM frame) the pulse detector 6089 detects a pulse at the output of the subtractor 6087. The output of the pulse detector is input to a frame synchronisation detect processor 60810 which processes the output of the pulse detector and outputs a signal $f_r$ indicating the that beginning of a frame has been detected.

Figure 14B:
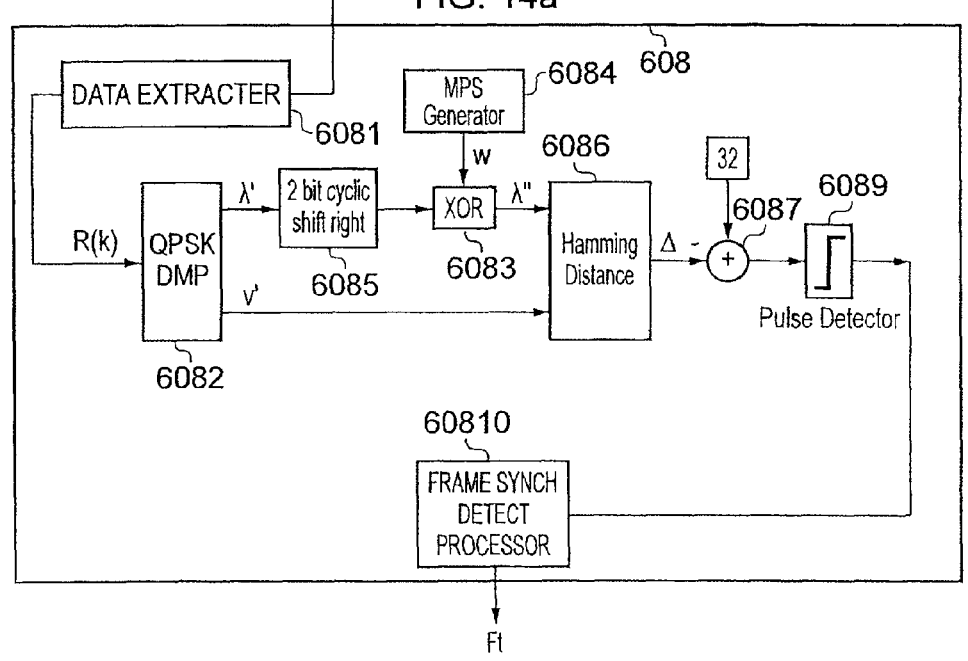

An equivalent procedure is to leave ν' unchanged, cyclic left shift λ', scramble the result with the 32 bit MPS sequence w to give λ". The Hamming distance Δ can then be computed between ν' and λ". FIG. 14b provides a schematic diagram illustrating this alternative implementation of the frame synchronisation detector 608.

Figure 15:
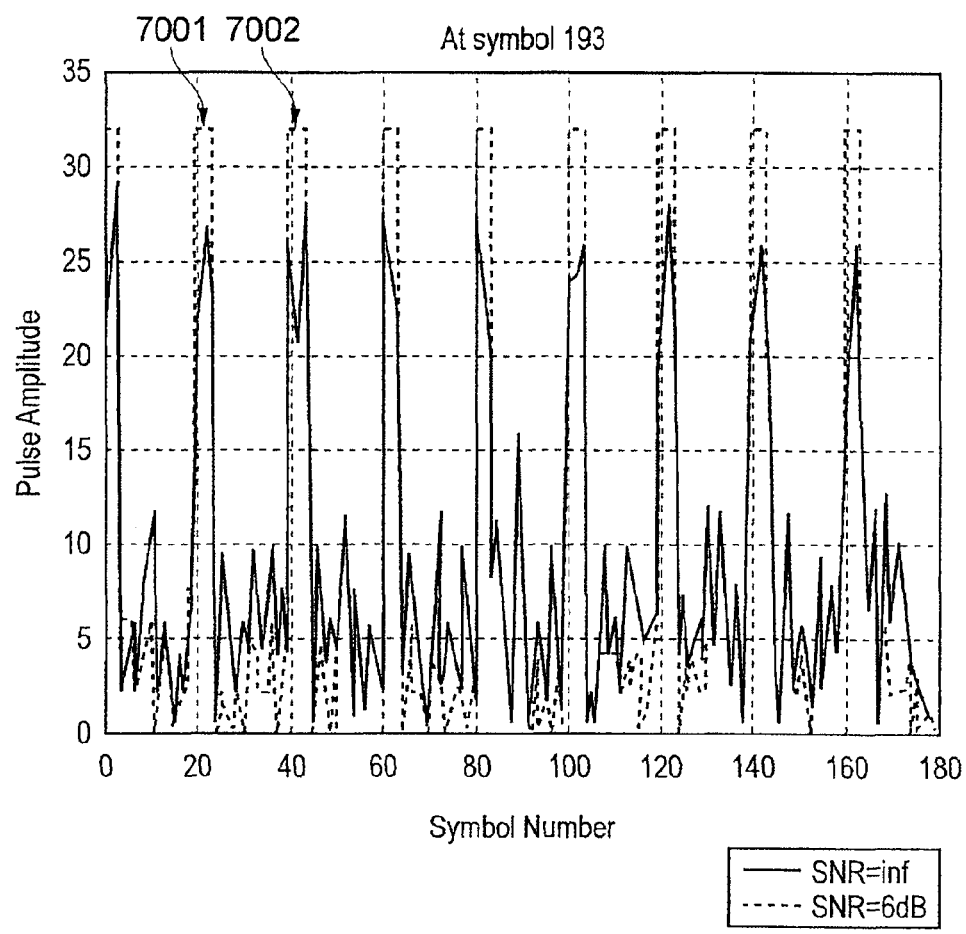
FIG. 15 provides a diagram illustrating a graph providing an indication of the input of a pulse detector using the frame synchronisation technique implemented in the frame synchronisation detectors shown in FIGS. 14a and 14b.

FIG. 15 provides a diagram illustrating a graph providing an indication of the output of the pulse detector 6089 using the frame synchronisation technique implemented in the frame synchronisation detectors shown in FIGS. 14a and 14b. In particular, the graph shown in FIG. 15 shows a series of peaks 7001, 7002 indicating a frame has been detected. A frequency of the peaks indicates a corresponding frequency in the occurrence of frames. For example, the graph of FIG. 15 indicates a frame rate of one frame per twenty symbols.

Soft Decision Matching

Figure 16A:
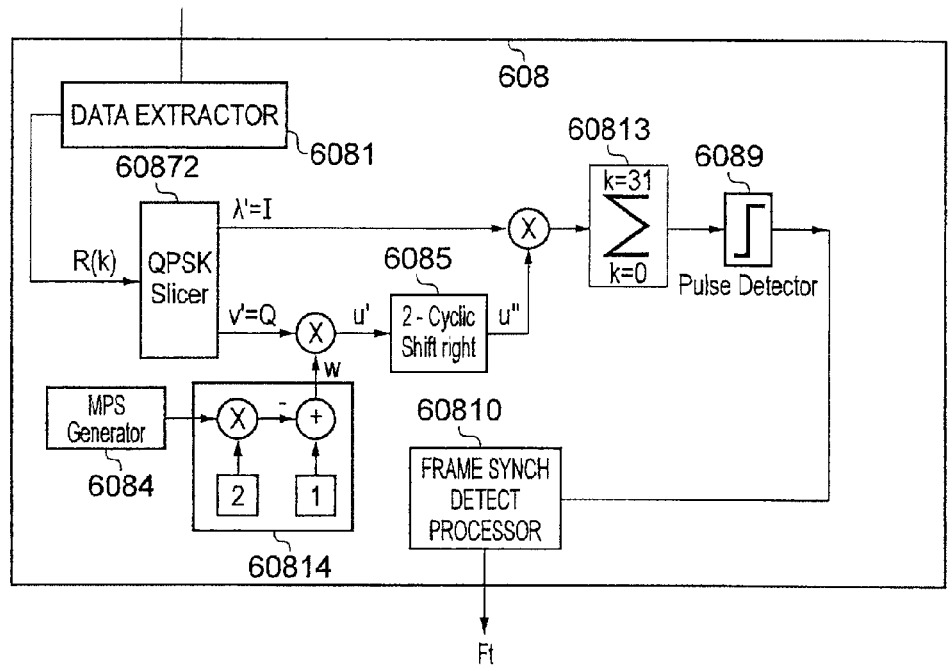
FIGS. 16a and 16b provide schematic diagrams illustrating a third and fourth implementation of a frame synchronisation detector.

FIG. 16a provides a schematic diagram illustrating another implementation of the frame synchronisation detector 608. The frame synchronisation detector shown in FIG. 16a a implements a "soft-decoding" algorithm to detect the preamble header of the OFDM frame (i.e. where continuous rather than absolute binary values are processed to detect the preamble header).

In the implementation of the frame synchronisation detector shown in FIG. 16a, the data stream R(k) representing data extracted from the first thirty two sub-carriers of the de-interleaved OFDM symbol are split into a real component stream λ'(k)=real(R(k)) and an imaginary component stream ν'(k)=imag(R(k)) by a QPSK slicer 60812. The MPS scramble sequence w is converted into a bipolar form by a bipolar converter 60814 to produce scrambling signal w'(k) in bipolar form (i.e. w'(k)=1−2w(k)). W'(k) is then multiplied with ν'(k) to produce a signal u'(k) which is cyclically shifted by two to produce a signal u"(k). u"(k) and λ'(k) are then multiplied and summed by a summation unit 60813. The output of the summation unit is connected to a pulse detector 6089. The input to the pulse detector can be represented by the following equation:

$$A = \sum_{k=0}^{31} u''(k) * \lambda'(k)$$

The pulse detector 6089 operates in conjunction with a frame synchronisation detector 60810 in generally the same way as described above with reference to FIG. 14a. Accordingly when the summation unit 60813 outputs a peak for a given symbol, this indicates that the current symbol being processed contains a preamble header and thus represents the beginning of an OFDM frame.

In a similar fashion to the hard decision implementation, an equivalent procedure is to leave ν' unchanged, cyclic left shift λ', scramble the result with the 32 bit MPS sequence w to give k". Then input to the pulse detector can be represented by the following equation:

$$A = \sum_{k=0}^{31} v'(k) * \lambda''(k)$$

Figure 16B:
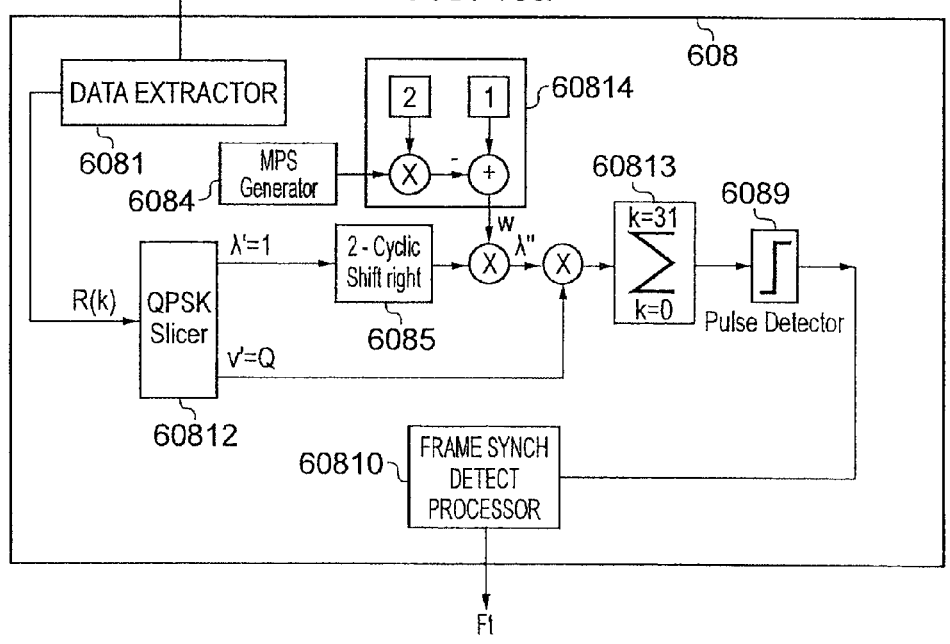

This implementation is shown in FIG. 16b.

Figure 17:
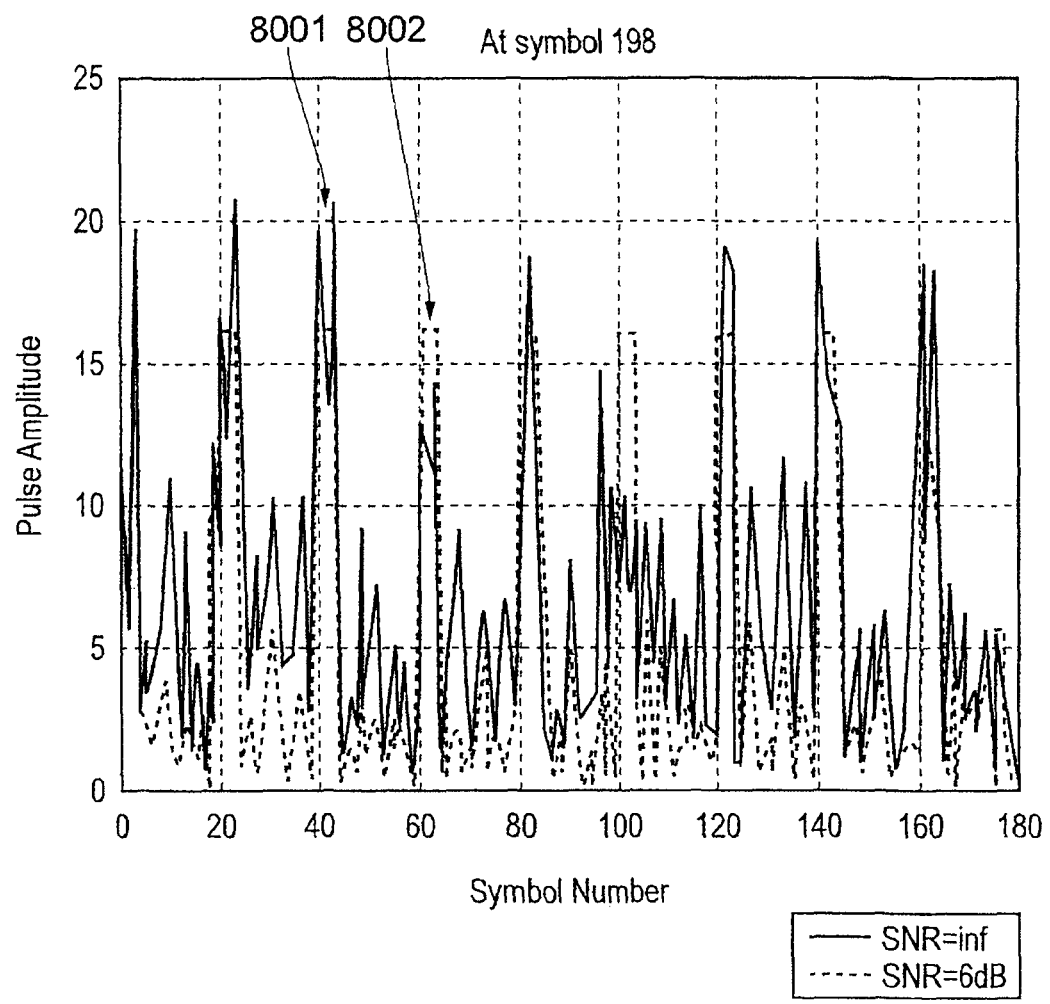
FIG. 17 provides a diagram illustrating a graph providing an indication of the input of a pulse detector using the frame synchronisation technique implemented in the frame synchronisation detectors shown in FIGS. 16a and 16b.

FIG. 17 provides a schematic diagram showing a graph providing an indication of the output of the pulse detector 6089 using the frame synchronisation technique implemented in the frame synchronisation detectors shown in FIGS. 16a and 16b. In particular, the graph shown in FIG. 17 shows a series of peaks 8001, 8002 indicating a frame has been detected. A frequency of the peaks indicates a corresponding frequency in the occurrence of frames. For example the graph of FIG. 17 indicates a frame rate of one frame per twenty symbols.

Summary of Operation

Figure 18:
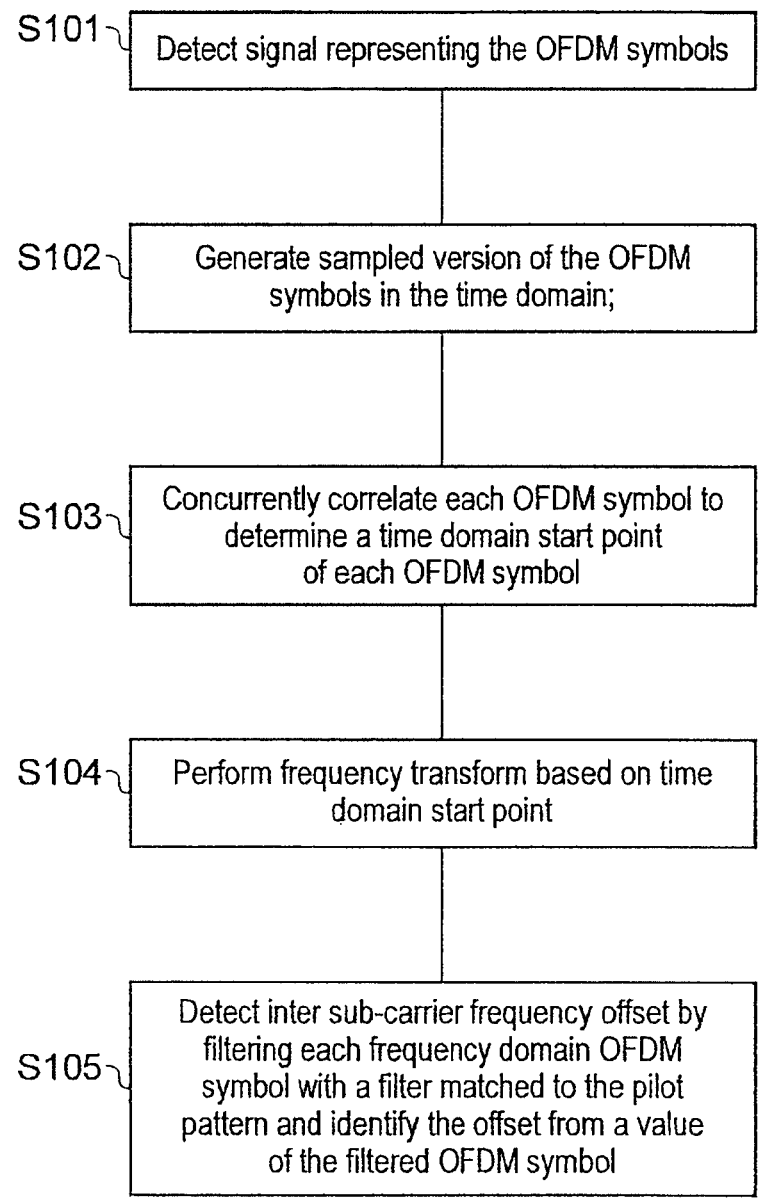
FIG. 18 is a flow diagram representing a process undertaken in accordance with an embodiment of the present invention.

FIG. 18 provides a flow diagram illustrating a process undertaken in accordance with an embodiment of the present invention.

At a first step S101, a signal representing the OFDM symbols is detected. At a second step S102 a sampled version of the OFDM symbols in the time domain is generated. At third step S103, each OFDM symbol is concurrently auto correlated using a plurality of correlation processes, each correlation process auto correlating the OFDM symbol with a length of samples corresponding to one of the plurality of predetermined lengths and the time domain start point of each symbol is determined. At a fourth step S104 a frequency transform is applied to the sampled OFDM symbol based on the time domain start point. At step S105 the coarse frequency offset is calculated.

Various modifications may be made to the embodiments herein before described. For example it will be understood that the particular component parts of which the receiver described above is comprised, for example the symbol synchronisation detector, the fine frequency offset detector, the coarse frequency offset detector and the frame synchronisation detector are essentially logical designations. Accordingly, the functionality that these component parts provide may be manifested in ways that do no conform precisely to the forms described above and shown in the diagrams. For example aspects of the invention be implemented in the form of a computer program product comprising instructions that may be implemented on a processor stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

It will be appreciated that the present invention is not limited to application with DVB and may be extended to other standards for transmission or reception, both fixed and mobile.

The invention claimed is:

1. A receiver for detecting and recovering data from Orthogonal Frequency Division Multiplexed (OFDM) symbols, the OFDM symbols including pilot data arranged in accordance with a pilot pattern which has been modulated with a unique random sequence, and a guard interval formed by copying samples from a useful part of the OFDM symbol in the time domain, a length of the guard interval for each OFDM symbol corresponding to one of a plurality of predetermined lengths, the receiver comprising
    a demodulator operable to detect a signal representing the OFDM symbols and to generate a sampled version of the OFDM symbols in the time domain,
    a symbol synchronisation unit comprising a plurality of correlators into each of which a same sampled OFDM symbol is concurrently input and a correlation detect processor, each correlator being operable to auto correlate each sampled OFDM symbol between a length of samples corresponding to one of the plurality of predetermined lengths, the correlation detect processor being operable to determine a time domain start point of each OFDM symbol based on a point at which one of the correlators from the plurality of correlators detects a correlation,
    a frequency transform processor operable to receive the sampled version of the OFDM symbols and to perform a frequency transform on the OFDM symbols to form a frequency domain version of the OFDM symbols starting at the time domain start point determined by the correlation detect processor, and
    a coarse frequency offset detector including a pilot data filter and a coarse frequency offset detection processor, the pilot data filter including taps corresponding to a value of the unique random sequence and a spacing of the pilot pattern of the OFDM symbols and arranged to receive as an input the frequency domain OFDM symbols from the frequency transform processor and the coarse frequency detection processor is arranged to determine a coarse frequency offset from an output of the pilot data filter.

2. A receiver as claimed in claim 1, wherein a sequence of the OFDM symbols forms a sequence of frames each frame comprising a plurality of preamble OFDM symbols and a plurality of data payload bearing OFDM symbols, the receiver comprising a frame detector for detecting a beginning point of each frame by detecting the presence of preamble pilot data sub-carriers in the preamble OFDM symbols of the frame.

3. A receiver as claimed in claim 1, wherein a sequence of the OFDM symbols forms a sequence of frames each frame comprising a plurality of preamble OFDM symbols and a plurality of data payload bearing OFDM symbols, the preamble OFDM symbols of each frame comprising a plurality of header sub-carriers carrying header data and the frame detector is operable to identify a beginning point of each frame by extracting data from the sub-carriers of the received OFDM symbols and identifying extracted data corresponding to the header data of the first OFDM preamble symbol.

4. A receiver as claimed in claim 1, wherein the OFDM symbols are transmitted in accordance with a Digital Video Broadcasting-Second Generation Cable DVB-C2 standard.

5. A method of detecting and recovering data from Orthogonal Frequency Division Multiplexed (OFDM) symbols, the OFDM symbols including pilot data arranged in accordance with a pilot pattern which have been modulated with a unique random sequence, and a guard interval, the guard interval being formed by copying samples from a useful part of the OFDM symbol in the time domain, a length of the guard interval for each OFDM symbol corresponding to one of a plurality of predetermined lengths, the method comprising
    detecting a signal representing the OFDM symbols;
    generating a sampled version of the OFDM symbols in the time domain;
    concurrently auto correlating each OFDM symbol using a plurality of correlation processes, each correlation process auto correlating the same OFDM symbol between a length of samples corresponding to one of the plurality of predetermined guard interval lengths and determining a time domain start point of each OFDM symbol based on a point at which one of the correlation processes detects a correlation;
    performing a frequency transform on the sampled OFDM symbols to form a frequency domain version of the OFDM symbols starting at the time domain start point determined by the correlation detect processor, and
    detecting a coarse frequency offset of the frequency domain OFDM symbols by monitoring the output of a filter which filters each frequency domain OFDM symbol, the filter having taps which correspond to a value of the unique random sequence and a spacing of the pilot pattern of the OFDM symbols.

6. A method as claimed in claim 5, wherein a sequence of the OFDM symbols forms a sequence of frames each frame comprising a plurality of preamble OFDM symbols and a plurality of data payload bearing OFDM symbols, the method including
    detecting a beginning point of each frame by detecting the presence of preamble pilot sub-carriers in the preamble OFDM symbols of the frame.

7. A method as claimed in claim 5, wherein a sequence of the OFDM symbols forms a sequence of frames each frame comprising a plurality of preamble OFDM symbols and a plurality of data payload bearing OFDM symbols, and the preamble OFDM symbols of each frame comprise a plurality of header sub-carriers carrying header data, comprising
detecting a beginning point of each frame by extracting data from the sub-carriers of the received OFDM symbols and identifying extracted data corresponding to the header data of the first OFDM preamble symbol.

8. A method as claimed in claim 5, wherein the OFDM symbols are transmitted in accordance with a Digital Video Broadcasting-Second Generation Cable DVB-C2 standard.

9. A non-transitory computer readable recording medium storing a computer program which when executed on a computer is arranged to carry out a method of detecting and recovering data from Orthogonal Frequency Division Multiplexed (OFDM) symbols, the OFDM symbols including pilot data arranged in accordance with a pilot pattern which have been modulated with a unique random sequence, and a guard interval, the guard interval being formed by copying samples from a useful part of the OFDM symbol in the time domain, a length of the guard interval for each OFDM symbol corresponding to one of a plurality of predetermined lengths, the method comprising:
detecting a signal representing the OFDM symbols;
generating a sampled version of the OFDM symbols in the time domain;
concurrently auto correlating each OFDM symbol using a plurality of correlation processes, each correlation process auto correlating the same OFDM symbol between a length of samples corresponding to one of the plurality of predetermined guard interval lengths and determining a time domain start point of each OFDM symbol based on a point at which one of the correlation processes detects a correlation;
performing a frequency transform on the sampled OFDM symbols to form a frequency domain version of the OFDM symbols starting at the time domain start point determined by the correlation detect processor, and
detecting a coarse frequency offset of the frequency domain OFDM symbols by monitoring the output of a filter which filters each frequency domain OFDM symbol, the filter having taps which correspond to a value of the unique random sequence and a spacing of the pilot pattern of the OFDM symbols.

10. A receiver comprising:
a demodulator operable to detect a signal representing OFDM symbols including pilot data arranged in accordance with a pilot pattern which has been modulated with a unique random sequence, and a guard interval formed by copying samples from a useful part of the OFDM symbol in the time domain, a length of the guard interval for each OFDM symbol corresponding to one of a plurality of predetermined lengths, the demodulator being operable to generate a sampled version of the OFDM symbols in the time domain,
a symbol synchronisation unit comprising a plurality of correlators into each of which a same sampled OFDM symbol is concurrently input and a correlation detect processor, each correlator being operable to auto correlate each sampled OFDM symbol with a length of samples corresponding to one of the plurality of predetermined lengths, the correlation detection processor being operable to determine a time domain start point of each OFDM symbol based on a point at which one correlator from the plurality of correlators detects a correlation,
a frequency transform processor operable to receive the sampled version of the OFDM symbols and to perform a frequency transform on the OFDM symbol to form a frequency domain version of the OFDM symbols starting at the time domain start point determined by the correlation detect processor, and
a coarse frequency offset detector including a pilot data filter and a coarse frequency offset detection processor, the pilot data filter including taps corresponding to a value of the unique random sequence and a spacing of the pilot pattern of the OFDM symbols and arranged to receive as an input the frequency domain OFDM symbols from the frequency transform processor and the coarse frequency detection processor being arranged to detect a coarse frequency offset from an output of the pilot data filter.

11. A receiver as claimed in claim 10, wherein a sequence of the OFDM symbols forms a sequence of frames each frame comprising a plurality of preamble OFDM symbols and a plurality of data payload bearing OFDM symbols, the receiver comprising a frame detector for detecting a beginning point of each frame by detecting the presence of preamble pilot data sub-carriers in the preamble OFDM symbols of the frame.

12. A receiver as claimed in claim 10, wherein a sequence of the OFDM symbols forms a sequence of frames each frame comprising a plurality of preamble OFDM symbols and a plurality of data payload bearing OFDM symbols, the preamble OFDM symbols of each frame comprising a plurality of header sub-carriers carrying header data and the frame detector is operable to identify a beginning point of each frame by extracting data from the sub-carriers of the received OFDM symbols and identifying extracted data corresponding to the header data of the first OFDM preamble symbol.

13. A receiver as claimed in claim 10, wherein the OFDM symbols are transmitted in accordance with a Digital Video Broadcasting-Second Generation Cable DVB-C2 standard.

14. An apparatus for detecting and recovering data from Orthogonal Frequency Division Multiplexed (OFDM) symbols, the OFDM symbols including pilot data arranged in accordance with a pilot pattern which has been modulated with a unique random sequence, and a guard interval, the guard interval being formed by copying samples from a useful part of the OFDM symbol in the time domain, a length of the guard interval for each OFDM symbol corresponding to one of a plurality of predetermined lengths, the apparatus comprising
means for detecting a signal representing the OFDM symbols;
means for generating a sampled version of the OFDM symbols in the time domain;
means for concurrently auto correlating each OFDM symbol using a plurality of correlation processes, each correlation process auto correlating the same OFDM symbol between a length of samples corresponding to one of the plurality of predetermined guard interval lengths and determining a time domain start point of each OFDM symbol based on a point at which one of the correlation processes detects a correlation;
means for performing a frequency transform on the sampled OFDM symbols to form a frequency domain version of the OFDM symbols starting at the time domain start point determined by the correlation detect processor, and
means for detecting a coarse frequency offset of the frequency domain OFDM symbols by monitoring the output of a filter which filters each frequency domain OFDM symbol, the filter having taps which correspond to a value of the unique random sequence and a spacing of the pilot pattern of the OFDM symbols.

* * * * *